US011934130B2

(12) United States Patent
Tajima

(10) Patent No.: US 11,934,130 B2
(45) Date of Patent: Mar. 19, 2024

(54) IMAGE FORMING APPARATUS

(71) Applicant: CANON KABUSHIKI KAISHA, Tokyo (JP)

(72) Inventor: Hirotoshi Tajima, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/079,041

(22) Filed: Dec. 12, 2022

(65) Prior Publication Data

US 2023/0244173 A1 Aug. 3, 2023

(30) Foreign Application Priority Data

Jan. 28, 2022 (JP) ................................ 2022-012465

(51) Int. Cl.
*G03G 15/00* (2006.01)
*G03G 21/18* (2006.01)

(52) U.S. Cl.
CPC ..... *G03G 15/5016* (2013.01); *G03G 21/1875* (2013.01)

(58) Field of Classification Search
CPC ............. G03G 15/5016; G03G 15/556; G03G 21/1875
USPC .................................. 399/81, 343, 358, 360
See application file for complete search history.

(56) References Cited

U.S. PATENT DOCUMENTS

| | | | | |
|---|---|---|---|---|
| 8,116,644 | B2 | 2/2012 | Ichikawa | |
| 8,116,645 | B2 | 2/2012 | Yamaguchi et al. | |
| 8,126,340 | B2 | 2/2012 | Bito et al. | |
| 9,069,321 | B2 * | 6/2015 | Kwon | G03G 21/12 |
| 10,976,693 | B2 * | 4/2021 | Hashimoto | G03G 15/556 |
| 11,397,402 | B2 * | 7/2022 | Ninomiya | G03G 21/12 |
| 11,415,928 | B2 | 8/2022 | Tajima et al. | |

FOREIGN PATENT DOCUMENTS

| | | | |
|---|---|---|---|
| JP | 2008-083102 | A | 4/2008 |
| JP | 2010-078952 | A | 4/2010 |
| JP | 2010-079079 | A | 4/2010 |
| JP | 2021-170106 | A | 10/2021 |

* cited by examiner

*Primary Examiner* — Hoan H Tran
(74) *Attorney, Agent, or Firm* — VENABLE LLP

(57) ABSTRACT

An image forming apparatus controls a feeding device to stop feeding residual toner to a first accommodating container and an image forming portion to continue an image forming operation, in a case the first accommodating container is not full and the first accommodating container is dismounted when the image forming operation is executed when the residual toner is fed to the first accommodating container. After detection of dismount of the first accommodating container until a predetermined time elapses, the feeding device stops feeding continuously the residual toner to the first accommodating container and does not start feeding the residual toner to the second accommodating container, and the image forming operation continues when the first accommodating container is not mounted, and the feeding device resumes feeding the residual toner to the first accommodating container and the image forming operation continues when the first accommodating container is mounted again.

8 Claims, 19 Drawing Sheets

IMAGE FORMING APPARATUS

FIELD OF THE INVENTION AND RELATED ART

The present invention relates to an image forming apparatus such as a copying machine, a printer, a facsimile machine, or a multi-function machine having a plurality of functions of these machines, using an electrophotographic type or an electrostatic recording type.

Conventionally, for example, in the image forming apparatus of the electrophotographic type, such as the copying machine, by an electrophotographic image forming process, a toner image formed on a photosensitive member as an image bearing member with a developer containing toner is transferred onto a transfer-receiving member such as a recording material. Toner (transfer residual toner) remaining on the photosensitive member during transfer of a toner image from the photosensitive member onto the transfer-receiving member is removed from the surface of the photosensitive member by a cleaning means and is fed as a collected developer to a collected developer container by a developer collecting device, so that the collected developer is accumulated inside the collected developer container. Then, the collected developer container is exchanged to a blank collected developer container in the case where the inside of the collected developer container becomes full with the collected developer or in the like case. Conventionally, in general, when the collected developer container is exchanged, there is a need to stop an image forming operation of the image forming apparatus in order to stop feeding of the collected developer by the developer collecting device. For that reason, for example, in a business operation in which continuous printing in a large volume is desired, there is a problem such that productivity lowers due to the exchange of the collected developer container.

In order to solve this problem, a constitution in which two collected developer containers are provided so as to be mountable in and dismountable from an apparatus main assembly of the image forming apparatus and in which a collected developer is selectively discharged from either one of two discharging portions for discharging the two collecting containers, respectively, has been disclosed (Japanese Laid-Open Patent Application (JP-A) 2008-83102). In the constitution disclosed in JP-A 2008-83102, in a stirring tank in which the collected developer is sent, a stirring member radially provided with a plurality of blades on a rotation shaft is disposed and a plurality of chambers for accommodating the collected developer are formed and defined by the plurality of blades. Then, the stirring member is rotated so that the plurality of chambers of the stirring tank successively pass through two openings provided in the stirring tank so as to communicate with the two discharging portions, respectively, so that the collected developer is discharged from the stirring tank. In the case where the collected developer is discharged from a right side-discharging portion of the two discharging portions disposed side by side with respect to a left-right direction, the feeding member rotates clockwise, and in the case where the collected developer is discharged from a left side-discharging portion of the two discharging portions, the feeding member rotates counterclockwise. According to this constitution, when one of the two collected developer containers is exchanged, if the other collected developer container is capable of collecting the collected developer, the one of the two collected developer containers can be exchanged without stopping an image forming operation.

However, as disclosed in JP-A 2008-83102, in the image forming apparatus provided with the developer collecting device capable of switching a feeding destination of the collected developer, the following problem arises.

For example, in the case of the first and second collected developer containers, the collected developer is fed to the first collected developer container and the second collected developer container is disposed in an apparatus main assembly in a full state, it would be considered that the first collected developer container is inadvertently pulled out to an outside of the apparatus main assembly. In such a case, when the image forming operation of the image forming apparatus is immediately stopped, there is a liability that productivity is impaired. This is true for the case where for example, when the collected developer is fed to the first collected developer container of the first and second collected developer containers, these two (first and second) collected developer containers are inadvertently pulled out to the outside of the apparatus main assembly. Further, for example, it would be considered that in the case where the collected developer is fed to the first collected developer container of the first and second collected developer containers and the second collected developer container is disposed in the apparatus main assembly in an empty state, the first collected developer container is inadvertently pulled out to the outside of the apparatus main assembly. In such a case, when the feeding destination of the collected developer is immediately switched to the second collected developer container, depending on a remaining chargeable amount of the first collected developer container, there is a liability that efficient use of the collected developer containers is impaired.

Therefore, as disclosed in JP-A 2008-83102, it would be considered that a constitution such as a locking means for preventing (locking) inadvertent pulling-out of the collected developer container in which the collected developer is fed is provided. However, such a constitution leads to complication of the apparatus and an increasing in cost, and therefore, it is desired to omit or simplify the constitution.

Incidentally, in the above, the collected developer was described as the transfer residual toner removed from the photosensitive member, but the collected developer generating in the image forming apparatus is not limited thereto. For example, the collected developer may also be transfer residual toner removed from an intermediary transfer member which feeds a toner image, primary-transferred from the photosensitive member as a first image bearing member, to a recording material for secondary transfer and which is used as a secondary image bearing member. Further, for example, the collected developer may also be a developer (which may contain toner and a carrier) or the like discharged from a developing device provided for developing an electrostatic image formed on the image bearing member.

SUMMARY OF THE INVENTION

A principal object of the present invention is to provide an image forming apparatus capable of suppressing a lowering in productivity and realizing efficient use of a collected developer container even in the case where the collected developer container in which the collected developer is fed is removed.

This object has been accomplished by the image forming apparatus according to the present invention.

According to an aspect of the present invention, there is provided an image forming apparatus comprising: an image forming portion configured to form a toner image; a first accommodating container provided detachably mountable and configured to accommodate residual toner discharged from the image forming portion; a second accommodating container provided detachably mountable and configured to accommodate the residual toner discharged from the image forming portion; a feeding device capable of feeding the residual toner, discharged from the image forming portion, to the first accommodating container and the second accommodating container; and a controller capable of controlling the feeding device so that a feeding designation is switched from the first accommodating container to the second accommodating container and capable of controlling the image forming portion so as to continue an image forming operation in a case that the first accommodating container is full when the residual toner is fed to the first accommodating container during an image forming operation, wherein in a case that the first accommodating container is removed when the residual toner is fed to the first accommodating container during the image forming operation, the controller controls the image forming portion so that feeding of the residual toner to the first accommodating container is stopped and the image forming operation is continued, and wherein the controller carries out control so that: (i) in a period until a predetermined time has elapsed after removal of the first accommodating container, in a case that the first accommodating container is kept in a removed state, the controller controls the feeding device so as not to feed the residual toner to the second accommodating container while continuing a stop of feeding of the residual toner to the first accommodating container and controls the image forming portion so as to continue the image forming portion, and (ii) in a case that the predetermined time has elapsed in a state in which the first accommodating container is removed and is kept removed, the controller controls the feeding device so as to start feeding of the residual toner to the second accommodating container and controls the image forming portion so as to continue the image forming operation.

Further features of the present invention will become apparent from the following description of exemplary embodiments with reference to the attached drawings.

Figure 3:
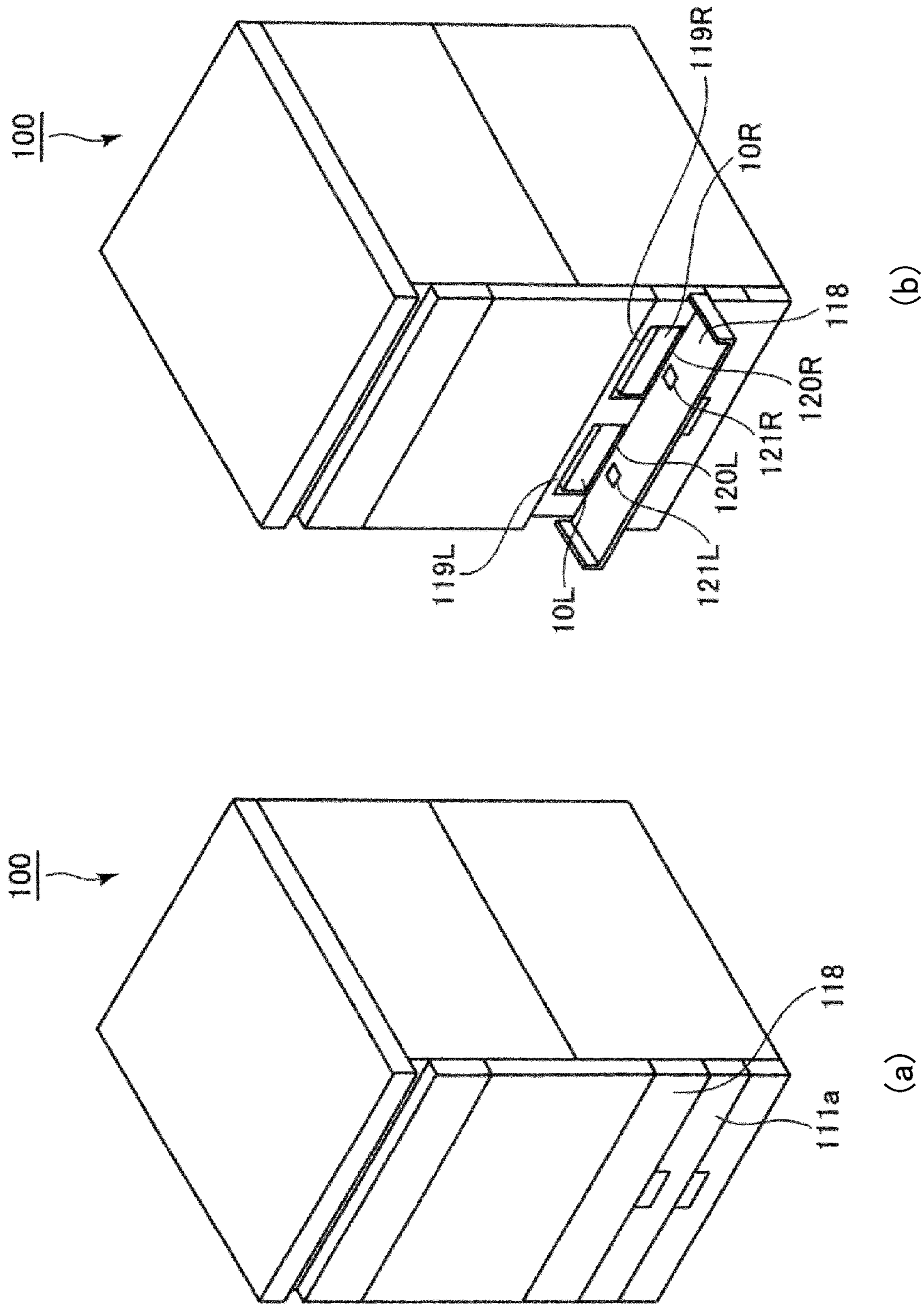

Parts (a) and (b) of FIG. 3 are schematic perspective views of the image forming apparatus for illustrating a mounting mode of a collected developer container.

Figure 4:
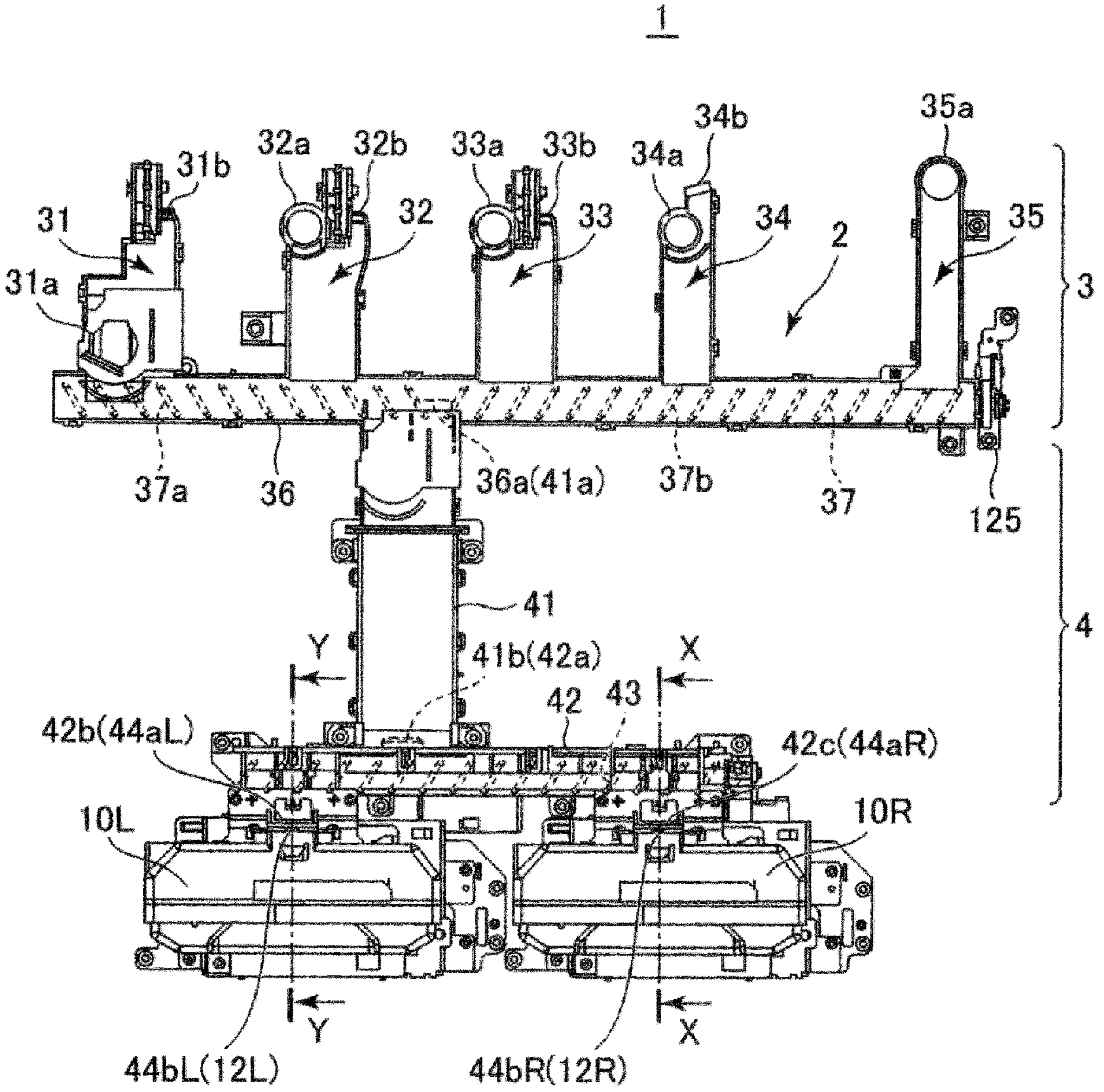

FIG. 4 is a front view of a developer collecting device.

Figure 5:
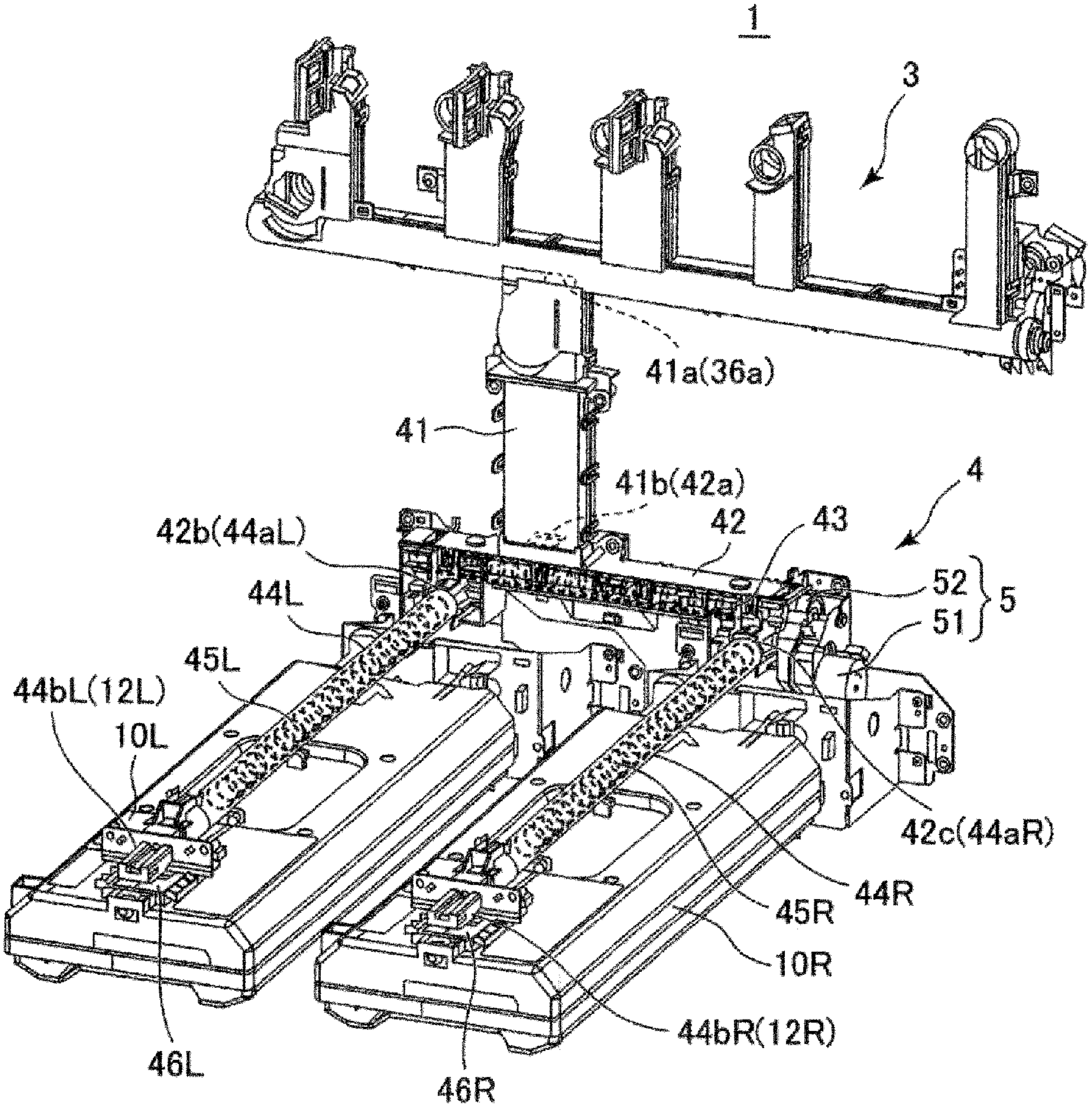

FIG. 5 is a perspective view of the developer collecting device.

Figure 6:
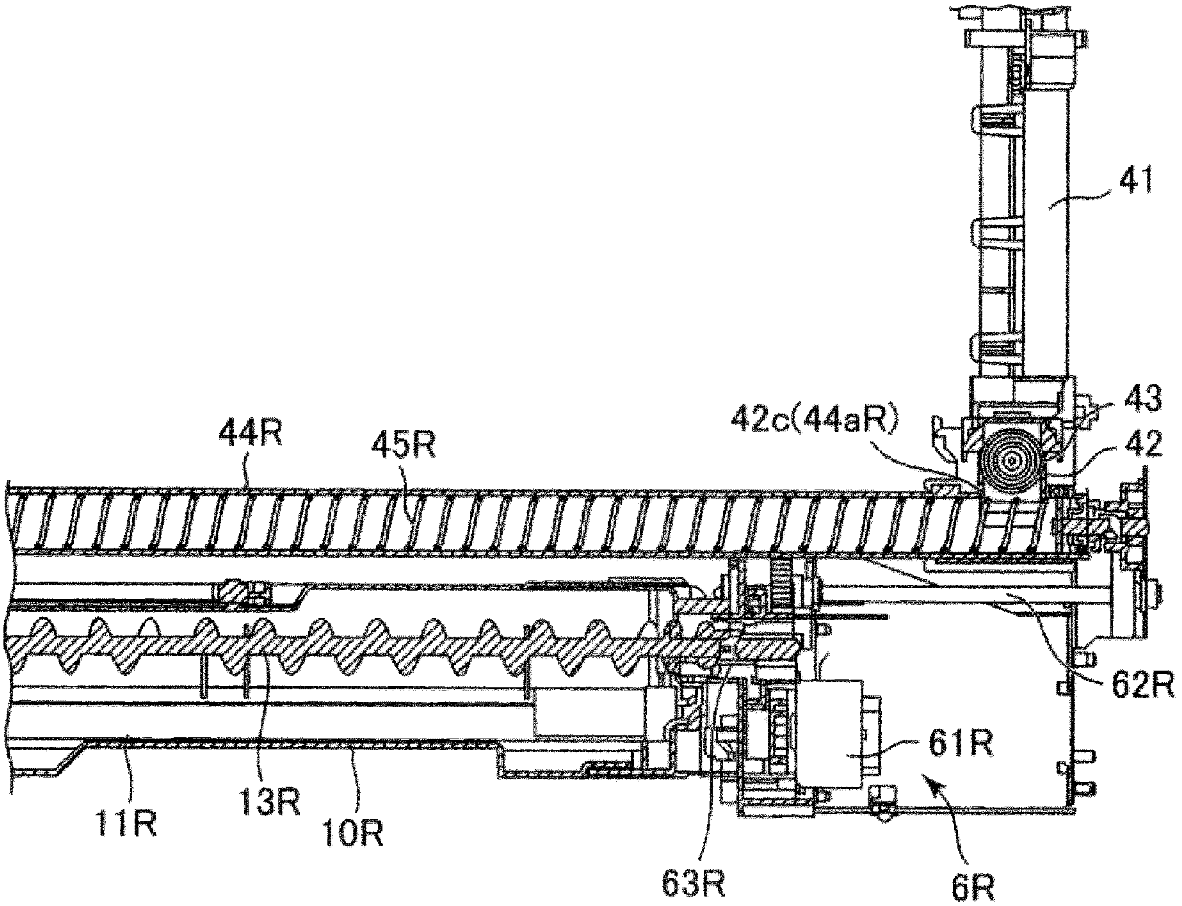

FIG. 6 is a sectional view taken along the X-X line of FIG. 4.

Figure 7:
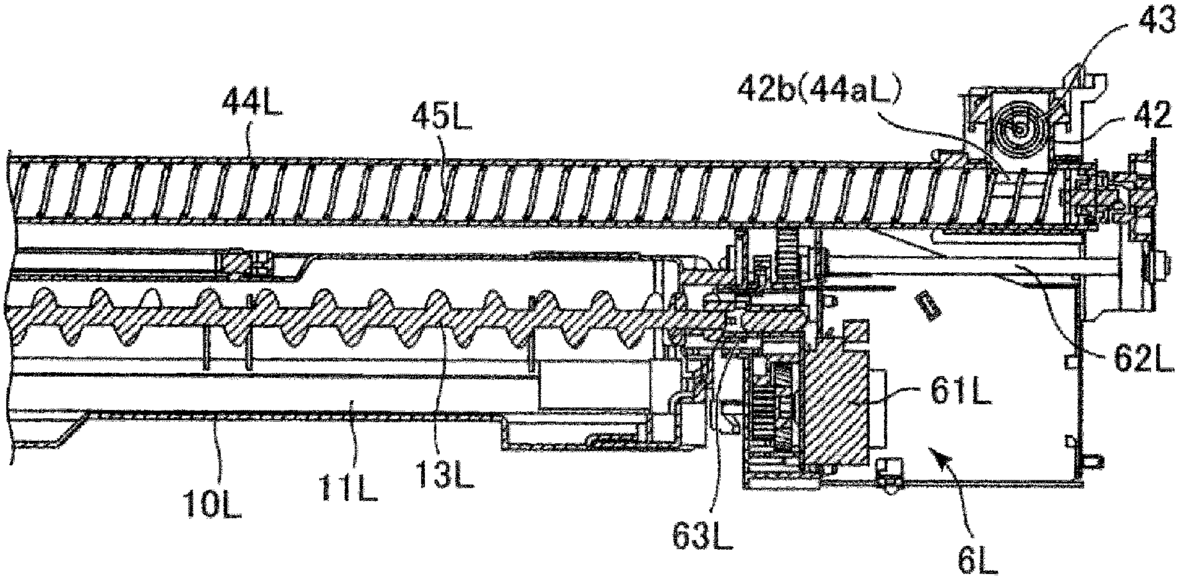

FIG. 7 is a sectional view taken along Y-Y line of FIG. 4.

Figure 8:
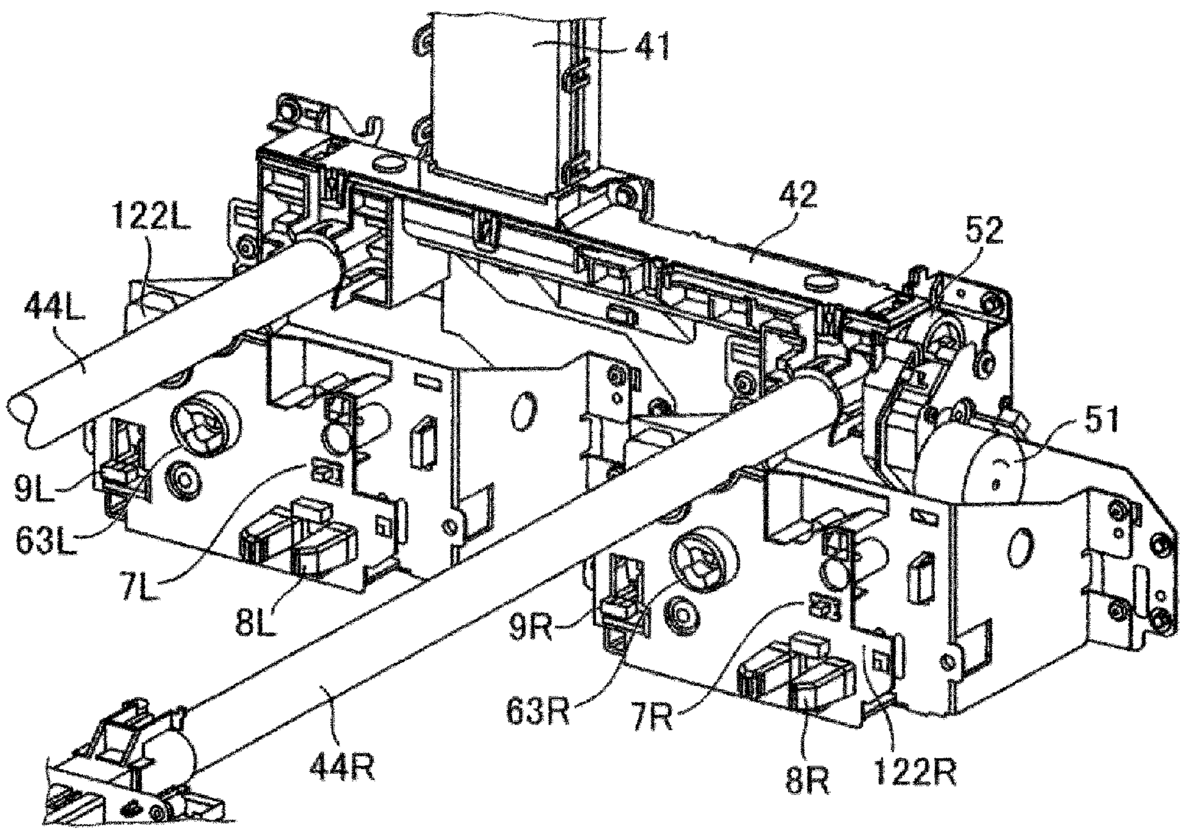

FIG. 8 is a perspective view of a part of the developer collecting device in a state in which the collected developer container is dismounted.

Figure 9:
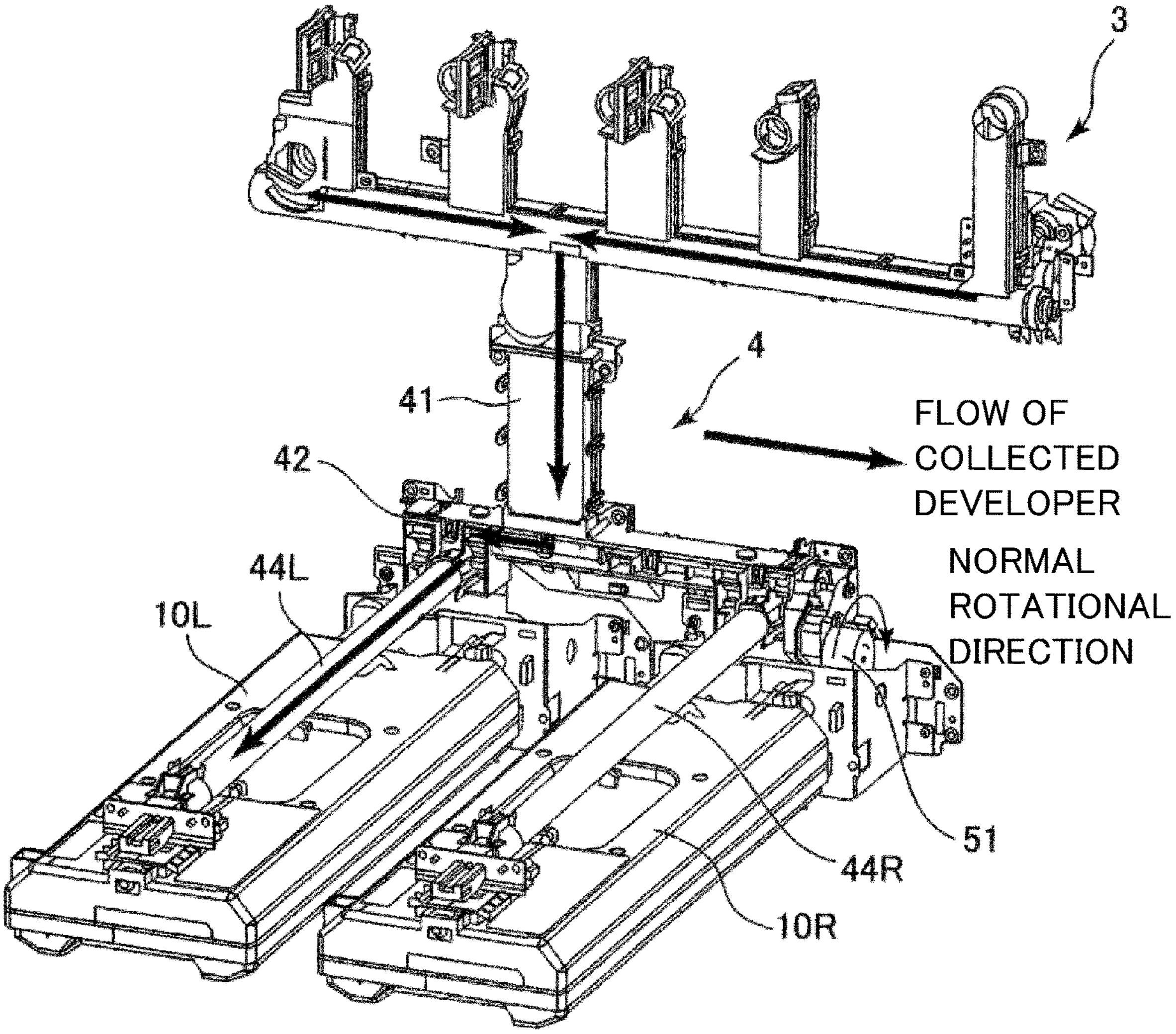

FIG. 9 is a perspective view of the developer collecting device for illustrating a developer collecting operation.

Figure 10:
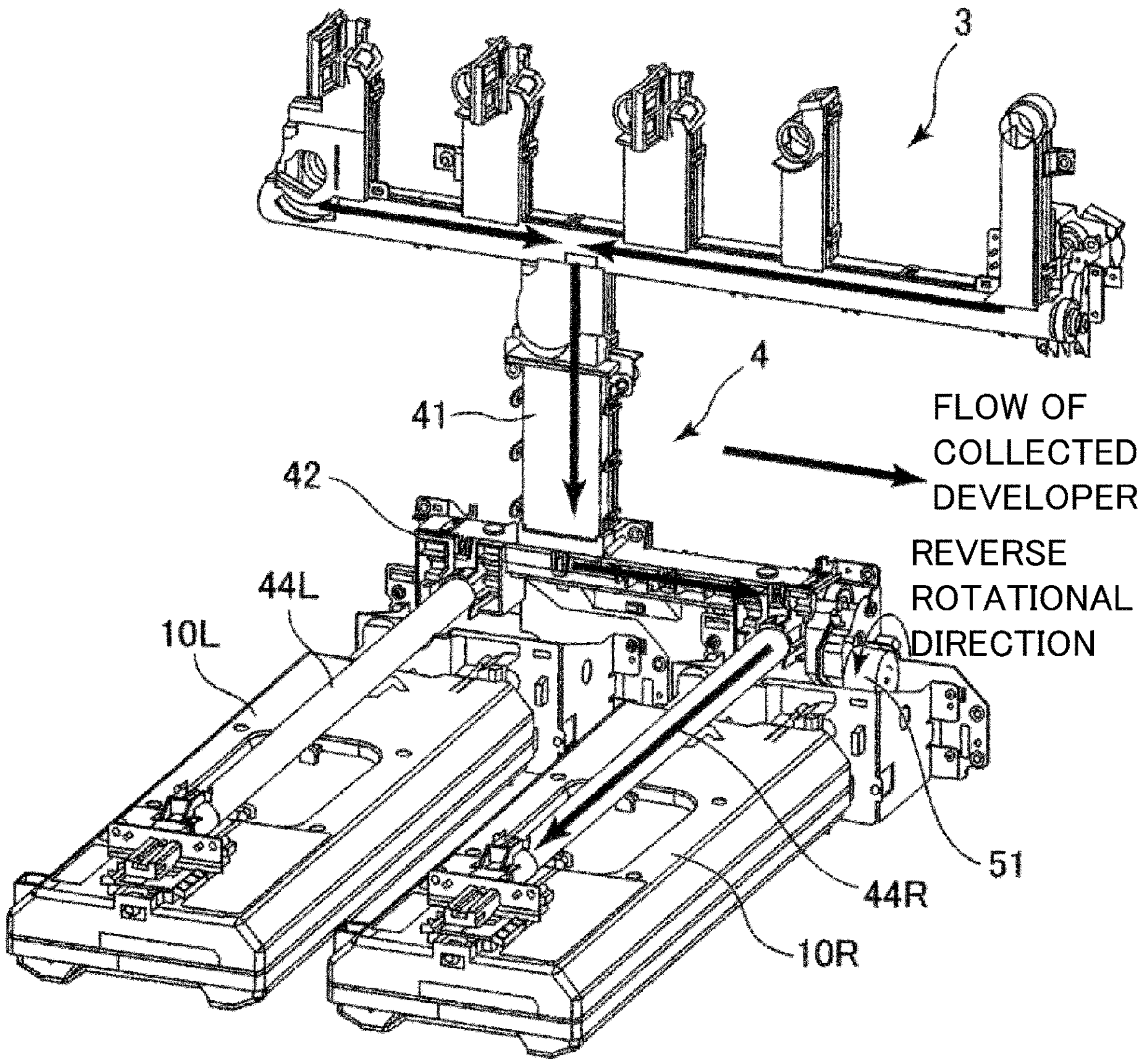

FIG. 10 is a perspective view of the developer collecting device for illustrating the developer collecting operation.

Figure 11:
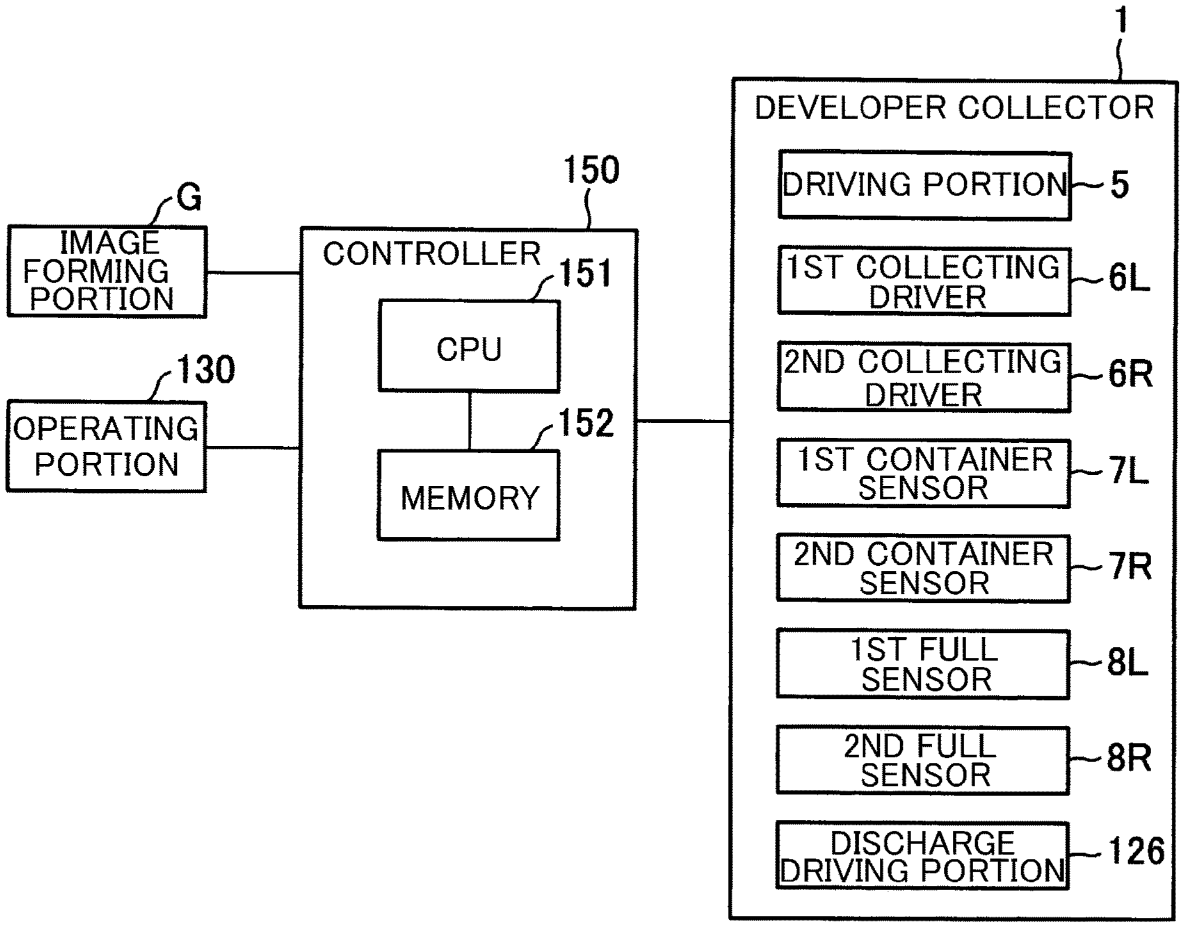

FIG. 11 is a block diagram showing a control mode of a developer collecting device.

Figure 12:
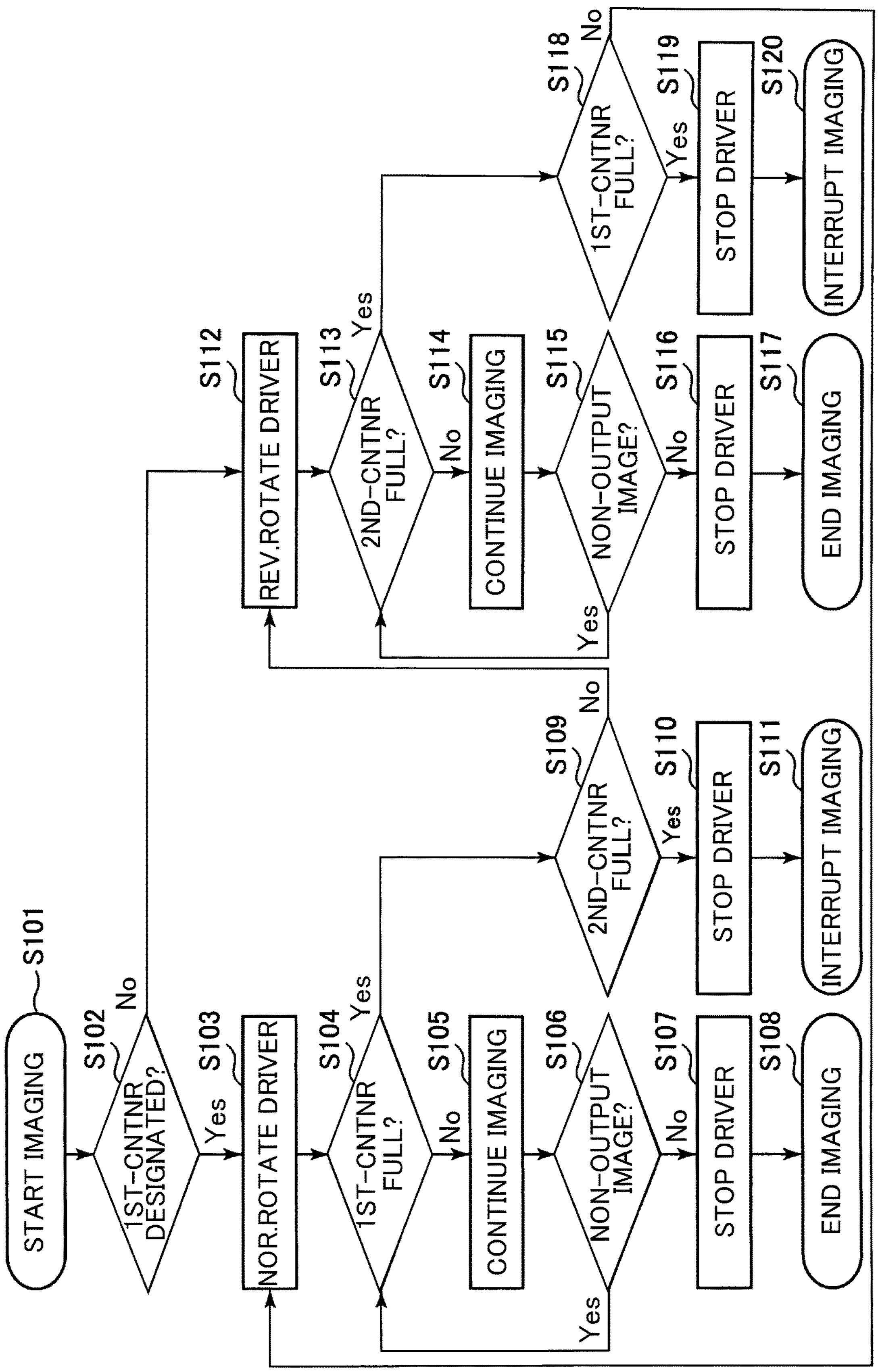

FIG. 12 is a flowchart of a basic operation of a developer collecting device.

Figure 13:
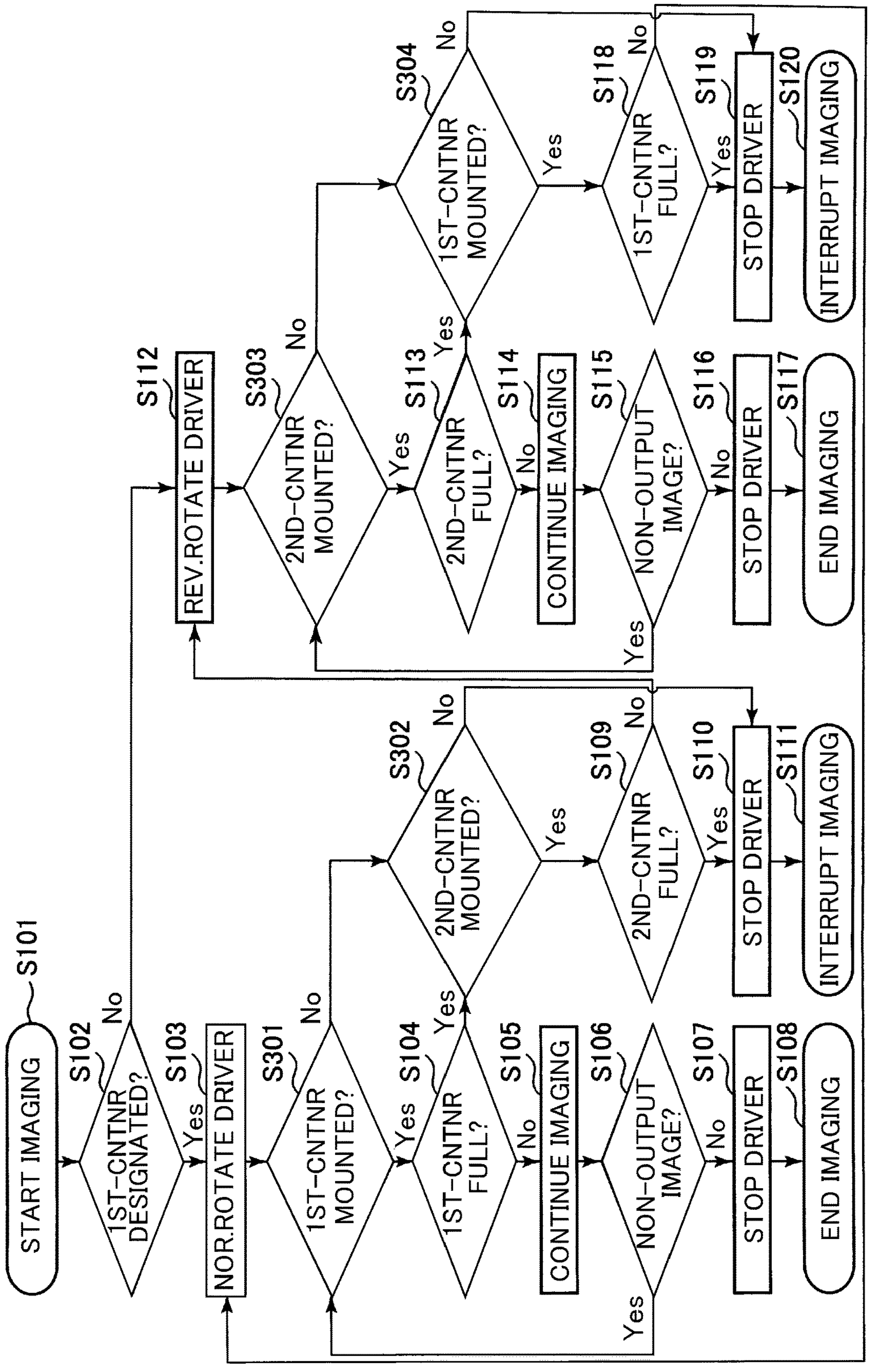

FIG. 13 is a flowchart of a basic operation of the developer collecting device.

Figure 14:
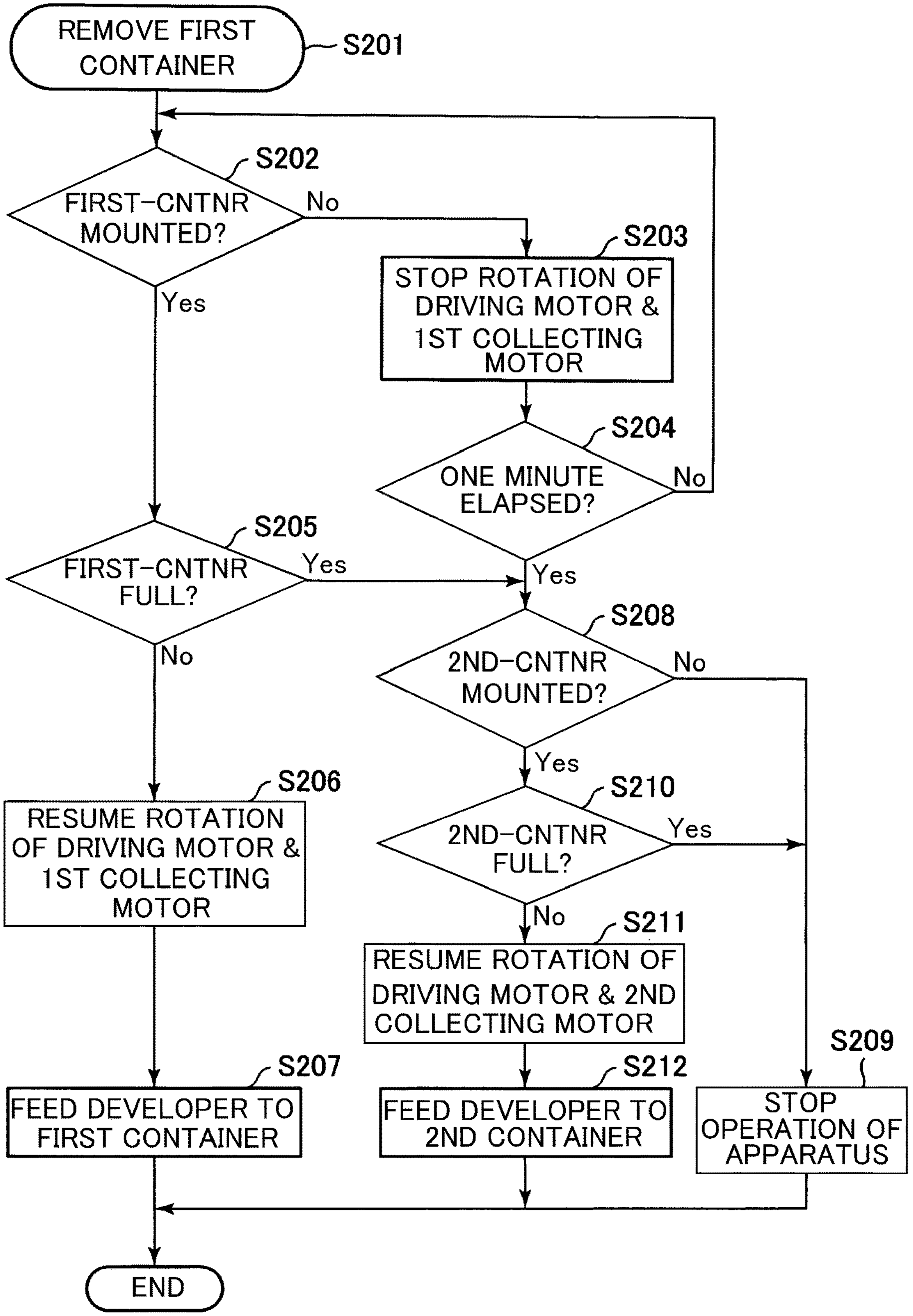

FIG. 14 is a flowchart of a specific operation in the case where a collected developer container which is a feeding destination of a collected developer.

Figure 15:
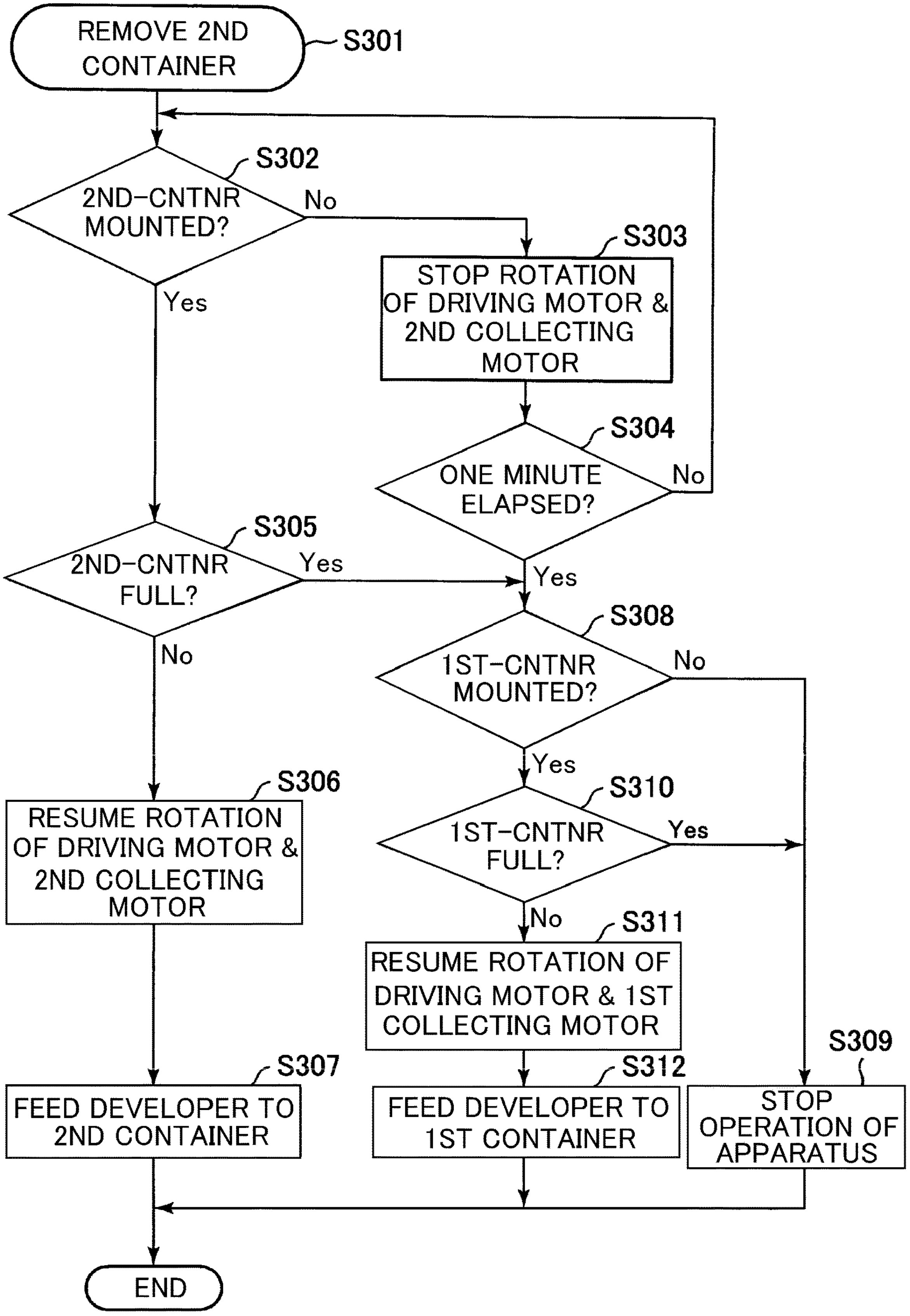

FIG. 15 is a flowchart of a specific operation in the case where a collected developer container is the feeding destination of the collected developer.

Figure 16:
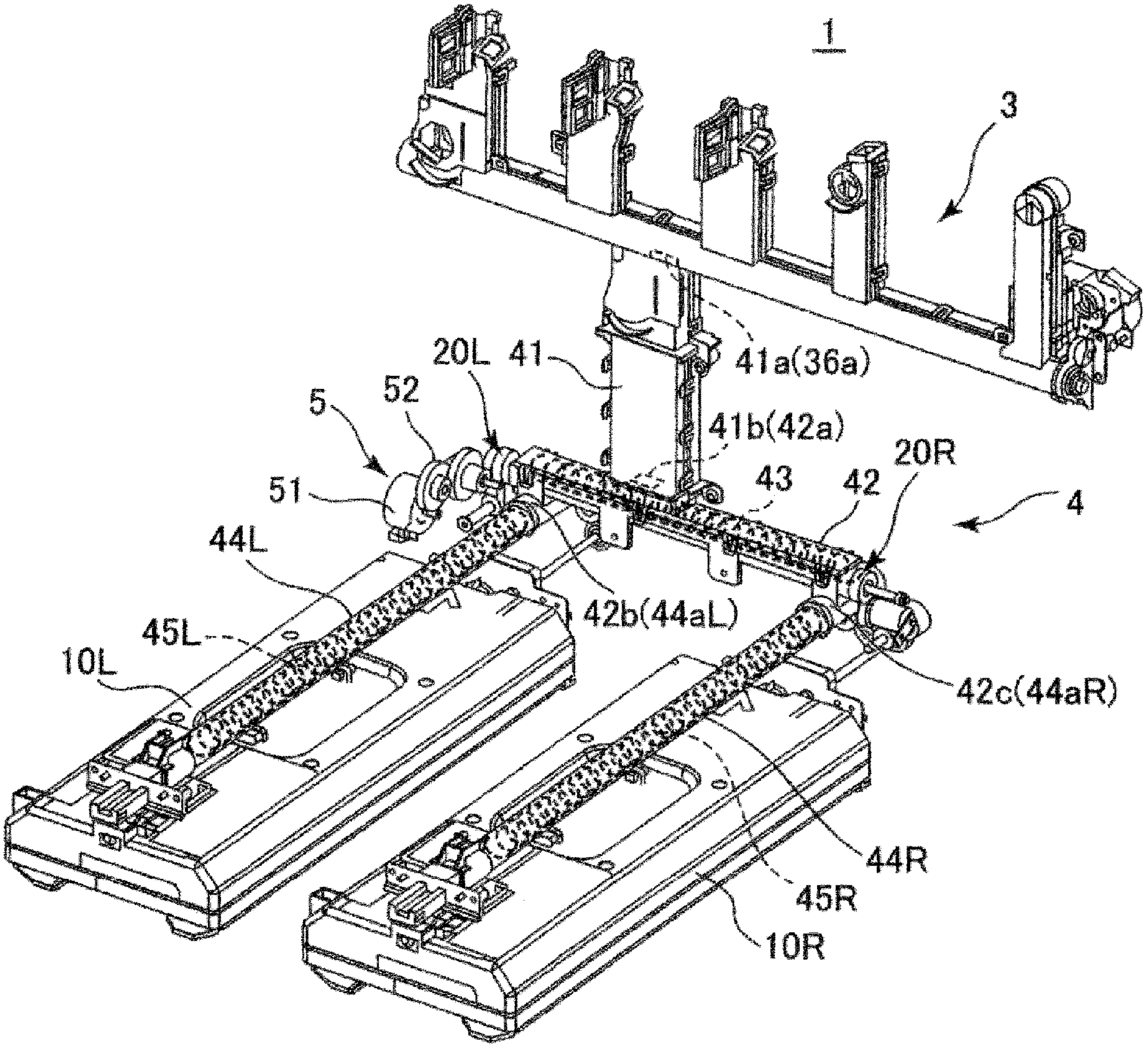

FIG. 16 is a perspective view of a collected developer container in another embodiment.

Figure 17:
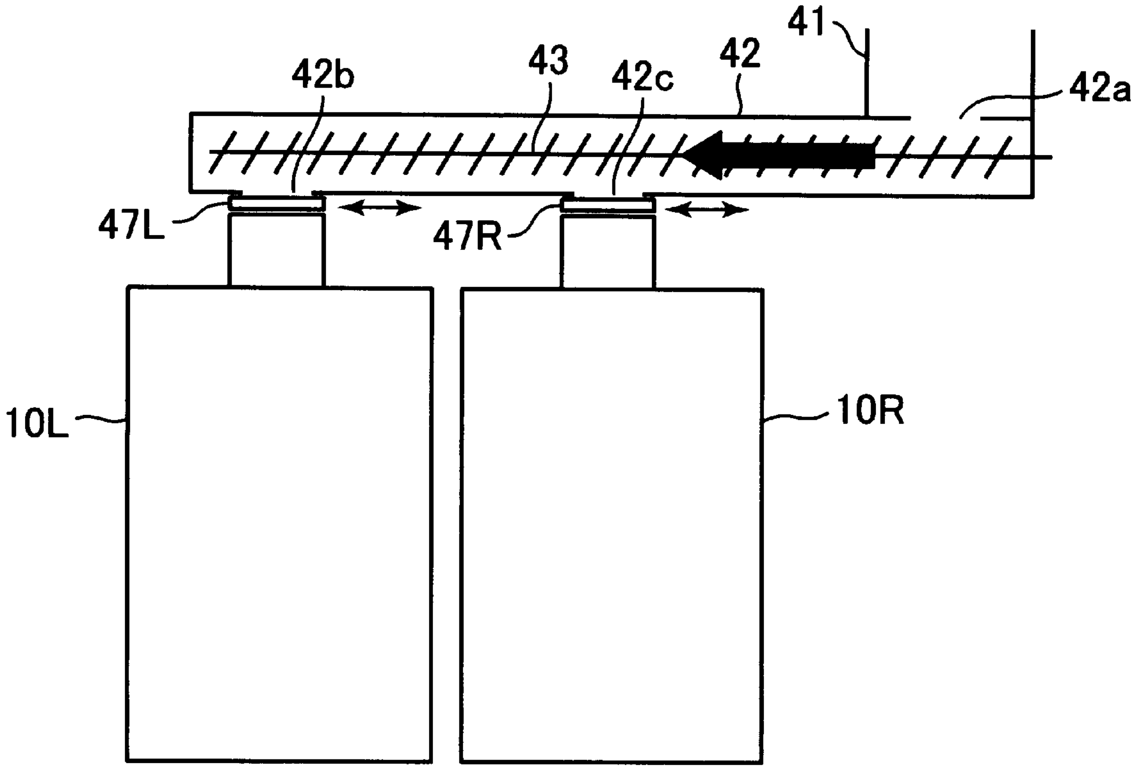

FIG. 17 is a schematic view of a part of the collected developer container in another embodiment.

Figure 18:
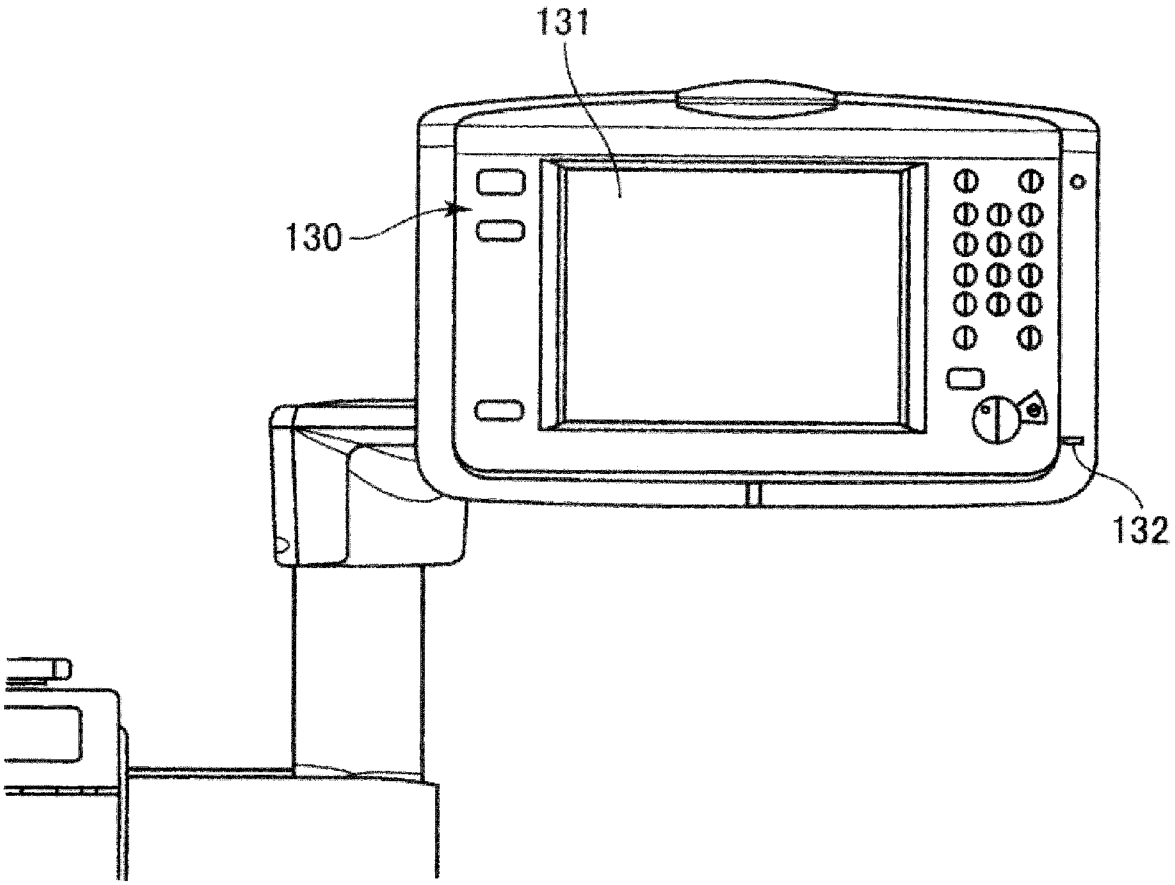

FIG. 18 is a schematic front view of an operating portion of an image forming apparatus.

Figure 19:
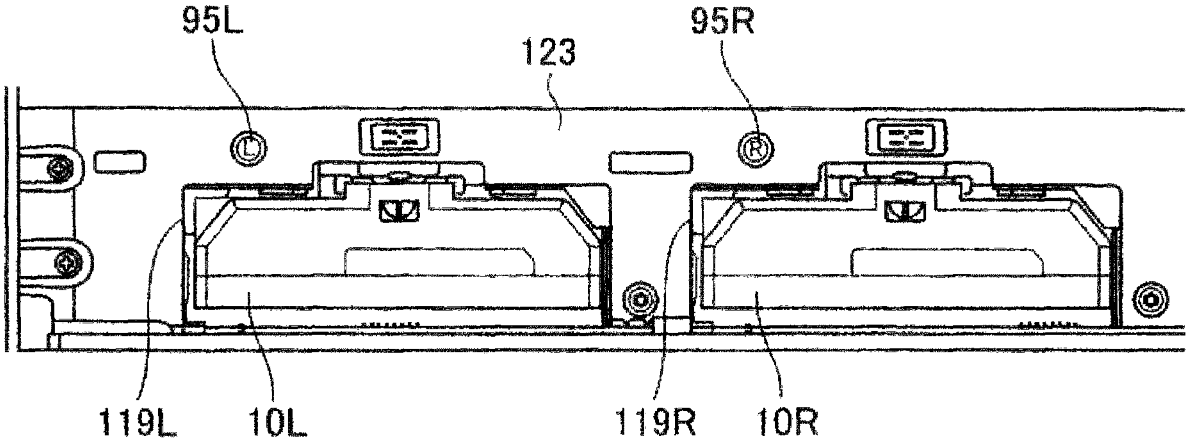

FIG. 19 is a schematic front view showing a collecting toner corresponding to accommodating portion of the image forming apparatus and a peripheral portion thereof.

DESCRIPTION OF THE EMBODIMENTS

A developer collecting device and an image forming apparatus according to the present invention will be described with reference to the drawings.

Embodiment 1

1. Image Forming Apparatus

Figure 1:
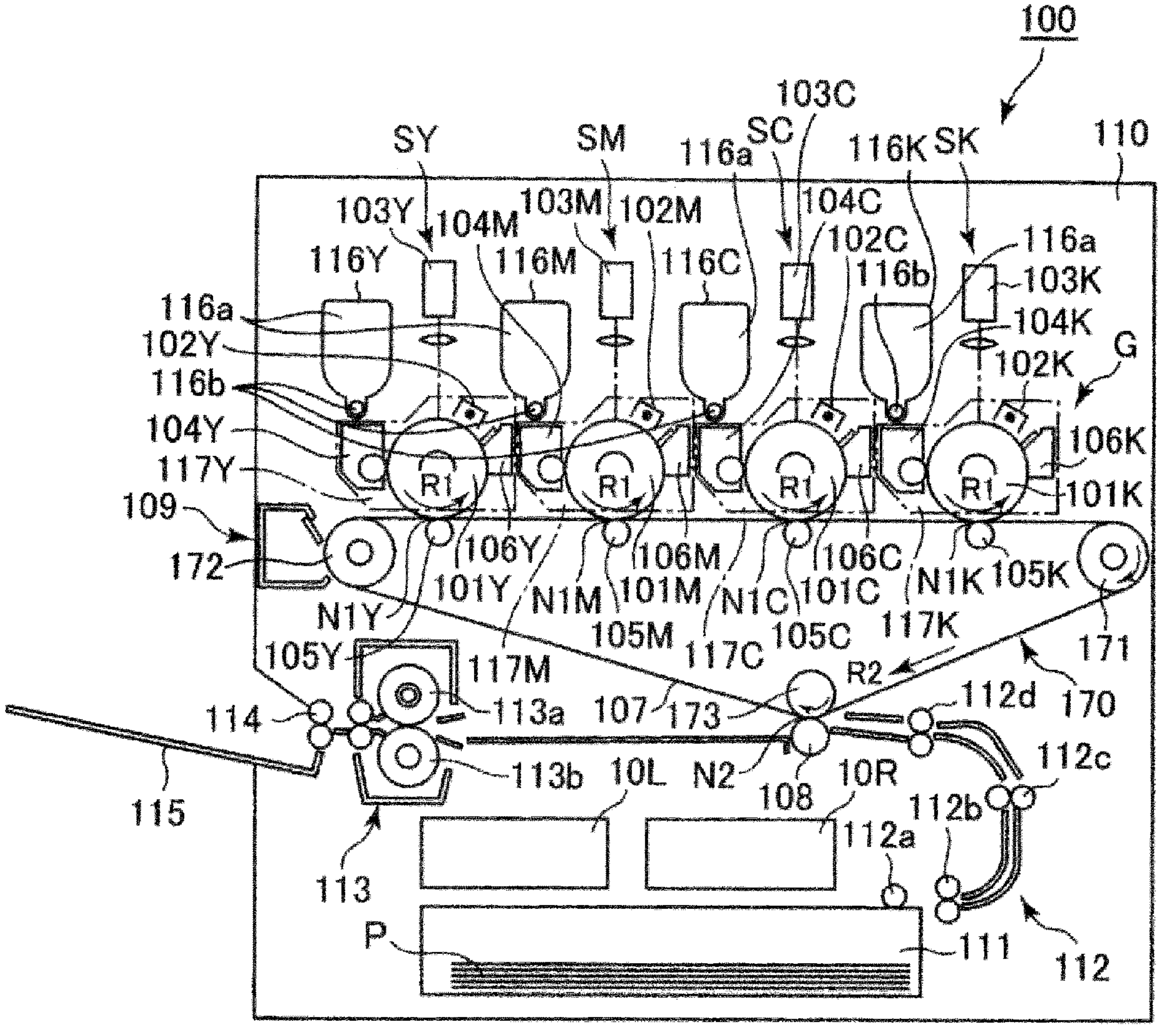
FIG. 1 is a schematic sectional view of an image forming apparatus.

FIG. 1 is a schematic sectional view (cross-section substantially perpendicular to a rotational axis direction of a photosensitive drum 101 described later) of an image forming apparatus 100 in this embodiment according to the present invention. The image forming apparatus 100 in this embodiment is a tandem-type printer capable of forming a full-color image by employing an electrophotographic type and an intermediary transfer type.

Incidentally, as regards the image forming apparatus 100 and constituent elements thereof, a front side on the drawing sheet of FIG. 1 is referred to as a "front" side, and a rear side on the drawing sheet of FIG. 1 is referred to as a "rear" side. An operator such as a user or a service person performs, in general, an operation of the image forming apparatus 100 from the front side of the image forming apparatus 100. A front-rear direction of the image forming apparatus 100 is substantially parallel to a rotational axis direction of the photosensitive drum 1 described later. Further, as regards the image forming apparatus 100 and the constituent elements thereof, a left side and a right side as viewed from the front side are referred to as a left side and a right side, respectively. A left-right direction of the image forming apparatus corresponds to a widthwise direction of the image forming apparatus 100. Further, as regards the image forming apparatus 100 and the constituent elements thereof, an up-down direction refers to an up-down direction with respect to the direction of gravitation (vertical direction), but does not mean only right above and right below, and also includes an upper side and a lower side of a horizontal plane passing through an associated element or position.

The image forming apparatus 100 includes as a plurality of image forming means, first to fourth stations SY, SM, SC and SK for forming toner images of yellow (Y), magenta (M), cyan (C) and black (K), respectively. As regards elements having the same or corresponding functions and constitutions in the respective stations SY, SM, SC and SK, suffixes Y, M, C and K representing the elements for associated colors are omitted, and the elements will be collectively described in some instances. In this embodiment, the station S is constituted by including the photosensitive drum 101, a charging device 102, an exposure device 103, a developing device 104, a primary transfer roller 105, a drum cleaning device 106, and the like. In this embodiment, the plurality (four in this embodiment) of stations SY, SM, SC and SK are provided and disposed side by side along a direction crossing the direction of gravitation, particularly along a substantially horizontal direction in this embodiment.

The photosensitive drum 101 which is a rotatable drum-shaped photosensitive member (electrophotographic photosensitive member) as a first image bearing member is rotationally driven in an indicated arrow R1 direction in FIG. 1. In this embodiment, the four photosensitive drums 101 are disposed side by side along the substantially horizontal direction. A surface of the rotating photosensitive drum 101 is electrically charged uniformly to a predetermined polarity (negative in this embodiment) and a predetermined potential by the charging device 102 as a charging means.

The surface of the charged photosensitive drum 101 is subjected to scanning exposure to light in accordance with image information by the exposure device (laser scanner) 103 as an exposure means, so that an electrostatic latent image (electrostatic latent image) is formed on the photosensitive drum 101. The electrostatic image formed on the photosensitive drum 101 is developed (visualized) by supplying the toner by the developing device 104 as a developing means, so that the toner image is formed on the photosensitive drum 101. In this embodiment, the toner charged to the same polarity (negative in this embodiment) as the charge polarity of the photosensitive drum 101 is deposited on an exposed portion (image portion) of the photosensitive drum 101 which is lowered in absolute value of the potential by the exposure to light after the photosensitive drum 101 is charged uniformly. In this embodiment, the normal charge polarity of the toner which is the charge polarity of the toner during the development is the negative polarity.

An intermediary transfer belt 107 which is an intermediary transfer member constituted by an endless belt as a second image bearing member is provided opposed to the photosensitive drums 101. The intermediary transfer belt 107 is extended around a driving roller 171, a tension roller 172 and a secondary transfer opposite roller 173 which are used as a plurality of stretching rollers (supporting rollers), and is stretched with a predetermined tension. The driving roller 171 is rotationally driven and a driving force is transmitted to the intermediary transfer belt 107, so that the intermediary transfer belt 107 is rotated (circulated and moved) in an arrow R2 direction in FIG. 1. On an inner peripheral surface side of the intermediary transfer belt 107, primary transfer rollers 105 which are roller-type primary transfer members as primary transfer means are provided correspondingly to the photosensitive drums 101. Each of the primary transfer rollers 105 is pressed (urged) against the intermediary transfer belt 107 toward the associated photosensitive drum 101, so that a primary transfer portion (primary transfer nip) N1 where the photosensitive drum 101 and the intermediary transfer belt 107 contact each other.

The toner image formed on the rotating photosensitive drum 101 is primary-transferred onto the rotating intermediary transfer belt 107 by the action of the primary transfer roller 105. During the primary transfer, to the primary transfer roller 105, a primary transfer voltage which is a DC voltage of an opposite polarity (positive in this embodiment) to the normal charge polarity of the toner is applied. For example, during full-color image formation, the respective color toner images of yellow, magenta, cyan and black formed on the respective photosensitive drums 101 are successively transferred superposedly onto the intermediary transfer belt 107.

At a position opposing the secondary transfer opposite roller 173 on an outer peripheral surface side of the intermediary transfer belt 107, a secondary transfer roller 108 which is a roller-type secondary transfer member as a secondary transfer means is provided. The secondary transfer roller 108 is pressed (urged) against the intermediary transfer belt 107 toward the secondary transfer opposite roller 173 and forms a secondary transfer portion (secondary transfer nip) N2 where the intermediary transfer belt 107 and the secondary transfer roller 108 are in contact with each other.

The toner images formed on the intermediary transfer belt 107 as described above are secondary-transferred onto the recording material (recording medium, sheet) P, such as a recording sheet, nipped and fed at the secondary transfer portion N2 by the intermediary transfer belt 107 and the secondary transfer roller 108. During the secondary transfer, to the secondary transfer roller 108, a secondary transfer voltage which is a DC voltage of an opposite polarity (positive in this embodiment) to the normal charge polarity of the toner during is applied. The recording material P is accommodated in a cassette 111 as a recording material accommodating portion. The recording material P is supplied from the cassette 111 to the secondary transfer portion N2 by a recording material feeding device 112. The recording material feeding device 112 includes a pick-up roller 112*a*, a feeding roller pair 112*b*, a conveying roller pair 112*c*, a registration roller pair 112*d*, and the like. The pick-up roller 112*a* sends recording materials P one by one from the cassette 111. The feeding roller pair 112*b* and the conveying roller pair 112*c* feed and convey the recording material P sent from the cassette 111. The registration roller pair 112*d* not only once stops the recording material P conveyed by the feeding roller pair 112*b* and the conveying roller pair 112*c* but also sends the recording material P toward the secondary transfer portion N2 in synchronism with timing of the toner images on the intermediary transfer belt 107.

The recording material P on which the toner images are transferred is conveyed to a fixing device 113. The fixing device 113 includes a fixing roller 113*a* provided with a heat source and a pressing roller 113*b* press-contacted to the fixing roller 113*a*. The fixing device 113 heats and presses the recording material P carrying unfixed toner images by nipping and conveying (feeding) the recording material P between the fixing roller 113*a* and the pressing roller 113*b*, so that the fixing device 113 fixes (melts and sticks) the toner images onto the recording material P. The recording material P on which the toner images are fixed is discharged (outputted) by a discharging roller 114 onto a tray 115 provided outside the apparatus main assembly 110 of the image forming apparatus 100.

Figure 2:
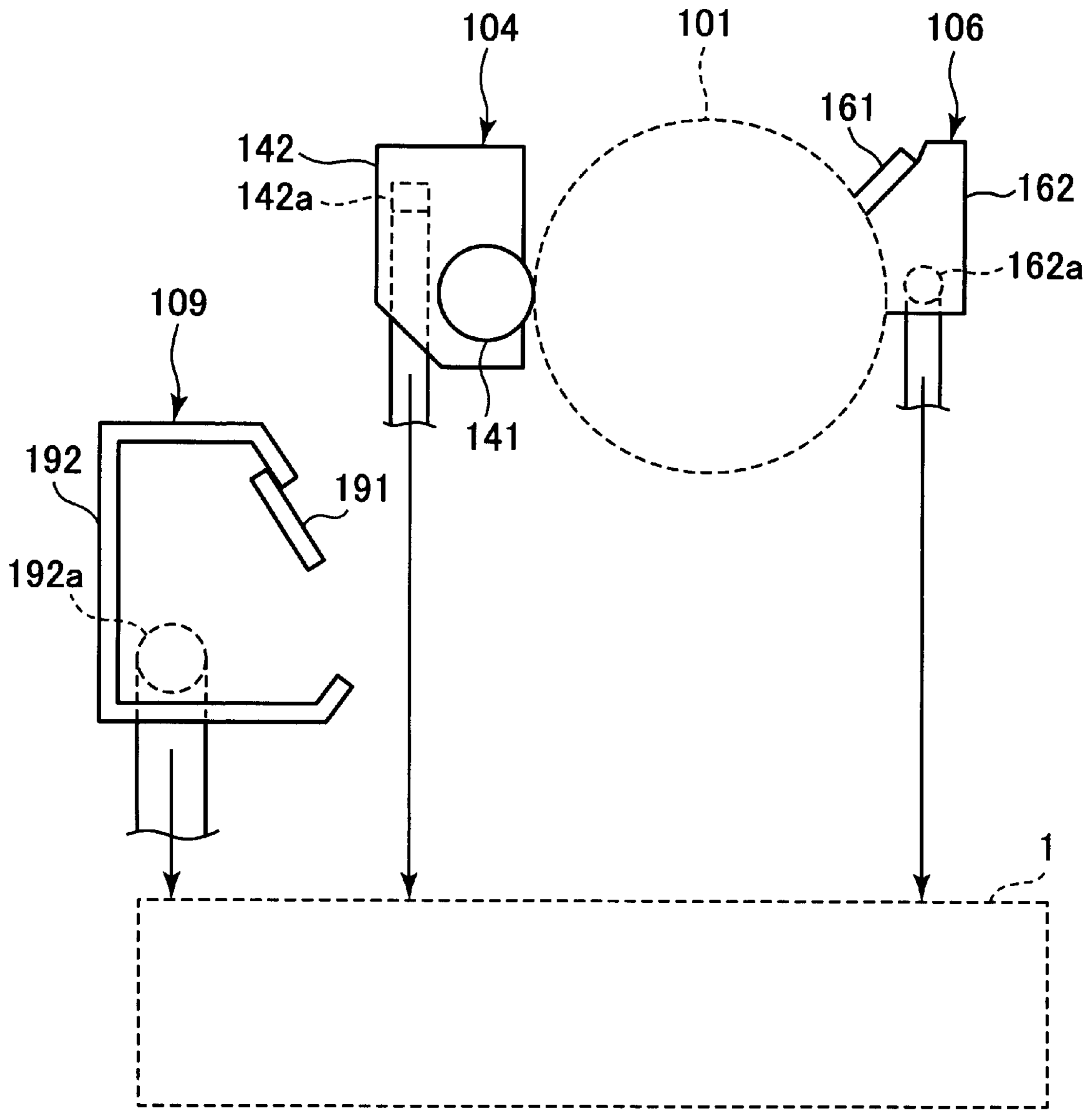
FIG. 2 is a schematic view showing a discharge mode of a collected developer from an image forming portion.

Further, toner (primary transfer residual toner) remaining on the photosensitive drum 101 without being transferred onto the intermediary transfer belt 107 during the primary transfer is removed and collected from the photosensitive drum 101 by the drum cleaning device 106 as a photosensitive member cleaning means. As shown in FIG. 2, the drum cleaning device 106 includes a drum cleaning blade 161 formed with an elastic member as a cleaning member and a drum cleaning container 162 as a toner collecting portion. The drum cleaning device 106 scrapes off the primary transfer residual toner from the surface of the rotating photosensitive drum 101 by the drum cleaning blade 161 disposed in contact with the surface of the photosensitive drum 101 and accommodates the toner inside the drum cleaning container 162.

Further, on the other peripheral surface side of the intermediary transfer belt 107, at a position opposing the tension roller 172, a belt cleaning device 109 as an intermediary transfer belt cleaning means is provided. Toner (secondary transfer residual toner) remaining on the intermediary transfer belt 107 without being transferred on the recording material P during the secondary transfer is removed and collected from the intermediary transfer belt 107 by the belt cleaning device 109. As shown in FIG. 12, the belt cleaning device 109 includes a belt cleaning blade 191 formed with an elastic member as a cleaning member and a belt cleaning container 192 as a toner collecting portion. The belt cleaning device 109 scrapes off the secondary transfer residual toner from the surface of the rotating intermediary transfer belt 107 by the belt cleaning blade 191 disposed in contact with the surface of the intermediary transfer belt 107 and accommodates the toner inside the belt cleaning container 192.

The primary transfer residual toner accommodated in the drum cleaning container 162 is fed by an unshown feeding means provided inside the drum cleaning container 162. Further, this primary transfer residual toner is discharged through a drum cleaning container discharge opening 162*a* which is an opening and is sent as a collected developer to a developer collecting device 1 described later. Further, the secondary transfer residual toner accommodated in the belt cleaning container 192 is fed by an unshown feeding means provided inside the belt cleaning container 192. Then, this secondary transfer residual toner is discharged through a belt cleaning container discharge opening 192*a* which is an opening and is sent as a collected developer to the developer collecting device 1 described later.

In this embodiment, in each of the stations S, the photosensitive drum 101 and, as process means actable on the photosensitive drum 101, the charging device 102, the developing device 104 and the cleaning device 106 integrally constitute a process cartridge 117. The process cartridge 117 is constituted so as to be mountable in and dismountable from the apparatus main assembly 110 by being pulled out to the front side of the image forming apparatus 100. The process cartridge 117 for the respective colors have the substantially same structure except that colors of the toners accommodated in the developing devices 104 are different from each other.

Further, in this embodiment, the intermediary transfer belt 107, the stretching rollers 171 to 173 of the intermediary transfer belt 107, the respective primary transfer rollers 105 and the belt cleaning device 109 and the like are integrally assembled into a unit and thus constitute an intermediary transfer unit 170. The intermediary transfer unit 170 is constituted so as to be mountable in and dismountable from the apparatus main assembly 110 by being pulled out from the right side of the image forming apparatus 100.

Further, the image forming apparatus 100 includes toner cartridges 116Y, 116M, 116C and 116K accommodating developers (supply developers) to be supplied to the developing devices 104Y, 104M, 104C and 104K. Each of the toner cartridges 116 is constituted so as to be mountable in and dismountable from the apparatus main assembly 110 by being pulled out to the front side of the image forming apparatus 100. The toner cartridges 116 for the respective colors have the substantially same structure except that colors of the toners accommodated therein and different from each other. Each of the toner cartridges 116 includes a supply developer accommodating portion 116*a* for accommodating the supply developer and a supplying screw 116*b* which is a supplying member for supplying the supply developer, inside the supply developer accommodating portion 116*a*, to the developing device 104.

Here, in this embodiment, the developing device 104 uses, as the developer, a two-component developer containing toner (non-magnetic toner particles) and a carrier (magnetic carrier particles). As shown in FIG. 2, the developing device 104 includes a rotatable developing sleeve 141 as a developer carrying member and a developer container 142 for accommodating (containing) the developer. The developing device 104 carries the developer containing the toner and the carrier on the developer sleeve 141 and feeds the developer to a developing position, where the photosensitive drum 101 and the developing sleeve 141 oppose each other, by rotation of the developing sleeve 141. The developing device 104 supplies the toner of the developer at the developing position to the electrostatic image on the photosensitive drum 101, so that the toner image is formed on the photosensitive drum 101. Further, the developer accommodated inside the developer container 142 and the supply developer supplied from the toner cartridge 116 are fed and circulated while being stirred by an unshown stirring and feeding means provided inside the developing container 142. In this embodiment, the supply developer supplied from the toner cartridge 116 to the developing device 104 contains the toner and the carrier. Further, the developer (containing the toner and the carrier) which became excessive by the supply of the supply developer and which exists inside the developing container 142 is discharged through the developer container discharge opening 142*a* which is the opening with circulation and feeding of the developer inside the developer container 142, so that the developer is sent as the collected developer to the developer collecting device 1 described later.

In this embodiment, an image forming portion G which is a mechanism portion G for forming the images on the recording material P by using the developers is constituted by the respective stations S, the intermediary transfer unit 170, the secondary transfer roller 108 and the fixing device 13. Incidentally, FIG. 2 is a schematic view showing a discharge made of the collected developer from the image forming portion G (the drum cleaning devices 106, the developing devices 104 and the belt cleaning devices 109 of the respective stations S).

2. Developer Collecting Container

In this embodiment, first and second collected developer containers 10L and 10R are provided as a plurality of collected developer containers so as to be mountable in and dismountable from the apparatus main assembly 110 of the image forming apparatus 100. In this embodiment, the first and second collected developer containers 10L and 10R are provided side by side along the substantially horizontal direction inside the apparatus main assembly 110. Particularly, in this embodiment, the first and second collected developer containers 10L and 10R have the substantially same structure and are disposed inside the apparatus main assembly 110 in parallel at the substantially same height (level) with respect to the up-down direction. Further, the collected developer sent from the image forming portion G to the developer collecting device 1 described later is selectively fed and accumulated into either one of the first and second collected developer containers 10L and 10R. In this embodiment, as described above, the collected developer (residual toner or waste toner) is discharged in the image forming portion G from the drum cleaning devices 106 and the developing devices 104 of the stations S and from the belt cleaning device 109. Further, in the case where the inside of either one of the first and second collected developer containers 10L and 10R becomes full with the collected developer, a feeding destination of the collected developer is switched to the other container, and the container full with the collected developer is exchanged to a blank container.

Incidentally, arrangement of the first and second collected developer containers 10L and 10R side by side along the substantially horizontal direction includes the case where the first and second collected developer containers 10L and 10R are disposed so as to at least partially overlap with each other with respect to the up-down direction. Each of the first and second collected developer containers 10L and 10R is a box-like container which has a predetermined length with respect to a longitudinal direction and the widthwise direction (short-side direction) and a predetermined thickness (height) with respect to a thickness direction and which has a substantially rectangular cross-section substantially perpendicular to the longitudinal direction. The longitudinal direction is a direction in which the container is disposed inside the apparatus main assembly 110 along the front-rear direction of the image forming apparatus 100. Further, the short-side direction is a direction in which the container is disposed inside the apparatus main assembly 110 along the left-right direction of the image forming apparatus 100. Further, the thickness direction is a direction in which the container is disposed inside the apparatus main assembly 110 along the up-down direction of the image forming apparatus 100. Inside the first and second collected developer containers 10L and 10R, hollow collected developer accommodating portions 11L and 11R (see FIGS. 6 and 7) each accommodating the collected developer therein are provided, respectively. As described above, in this embodiment, the first and second collected developer containers 10L and 10R have the substantially same structure, and each container can be mounted inside the apparatus main assembly 110 on not only a left side but also a right side. In this embodiment, inside the apparatus main assembly 110, the first collected developer container (first accommodating container) 10L is mounted on the left side, and the second collected developer container (second accommodating container) 10R is mounted in the right side.

Parts (a) and (b) of FIG. 3 are schematic perspective views of an outer appearance of the image forming apparatus for illustrating a mounting mode of the first and second collected developer containers 10L and 10R as viewed from an obliquely front side. Part (a) of FIG. 3 shows a state in which a container exchanging door 118 described later is closed, and part (b) of FIG. 3 shows a state in which the container exchanging door 118 is opened and in which the first and second collected developer containers are mountable and dismountable through the container exchanging door 118. On the front side of the image forming apparatus 100, the container exchanging door 118 which not only constitutes a part of an outer casing cover of the image forming apparatus 100 but also enables mounting and dismounting of the first and second collected developer containers 10L and 10R is provided. In this embodiment, the container crossing door 118 is constituted by a single (common) openable (closable) member through which both the first and second collected developer containers 10L and 10R are mountable and dismountable. In this embodiment, the container exchanging door 118 has a substantially rectangular shape extending in the left-right direction as viewed from the front side. Further, in this embodiment, the container exchanging door 118 is constituted so as to be rotatable at a lower portion thereof about a rotational axis extending along the left-right direction (widthwise direction) crossing the up-down direction. Further, the container exchanging door 118 can be opened and closed by rotating an upper side thereof about the rotational axis extending along the left-right direction on a lower side with respect to the up-down direction by an operation of an operator.

As shown in part (a) of FIG. 3, the container exchanging door 118 assumes, in a closed state, a single panel-like outer appearance equal in size, with respect to the left-right direction and the up-down direction, to a front panel 111*a* of the cassette 111 provided downward adjacent to the container exchanging door 118. For that reason, a complicated outer appearance due to provision of two containers (first and second collected developer containers 10L and 10R) is suppressed. Further, by opening the single container exchanging door 118, the mounting and the dismounting of either one of the first and second collected developer containers 10L and 10R can be carried out. For that reason, a wasteful operation due to erroneous opening and closing of the door, which can occur in the case where each of the plurality of collected developer containers is independently provided with a container exchanging door can be suppressed.

As shown in part (b) of FIG. 3, by opening the container exchanging door 118, the operator has access to either one of the first and second collected developer containers 10L and 10R. The apparatus main assembly 110 is provided with first and second container mounting portions 119L and 119R in which the first and second collected developer containers 10L and 10R are mounted, respectively. The first and second container mounting portions 119L and 119R are provided with first and second container supporting portions 120L and 120R, respectively, extending in the front-rear direction so as to support a lower side of the first and second collected developer containers 10L and 10R, respectively. The first and second container mounting portions 119L and 119R have rail-like structures (not shown) in which, for example, the first and second container supporting portions 120L and 120R engage with the first and second collected developer containers 10L and 10R, respectively. By this, the first and second collected developer containers 10L and 10R are slid (moved) from the front side toward the rear side and thus can be disposed at predetermined positions inside the apparatus main assembly 110. Further, the first and second collected developer containers 10L and 10R are slid (moved) from the rear side toward the front side and thus are pulled out from the predetermined positions inside the apparatus main assembly 110, so that the first and second collected developer containers 10L and 10R can be easily dismounted from the apparatus main assembly 110.

As shown in part (b) of FIG. 3, on an inside surface of the container exchanging door 118, first and second discrimination displays (discrimination display portions) 121L and 121R are provided so that the operator can visually recognize the container exchanging door 118 in an open state. The discrimination display portions 121L and 121R are disposed at positions corresponding to the first and second collected developer containers 10L and 10R, respectively, with respect to the left-right direction. In this embodiment, the discrimination display portions 121L, and 121R are disposed on an inside surface of the container exchanging door 118 positioned adjacent to the front side of the respective mounting portions in a range in which the discrimination display portions 121L, and 121R at least partially overlap with the first and second container mounting portions 119L, and 119R, respectively, with respect to the left-right direction. In this embodiment, the left side-first discrimination display portion (first mark) 121L is constituted by a seal on which a character such as a "container 1" (or a "left container") as first discrimination information is displayed for discriminating the first collected developer container 10L. Further, in this embodiment, the right side-second discrimination display portion (second mark) 121R is constituted by a seal on which a character such as a "container 2" (or a "right container") as second discrimination information is displayed for discriminating the second collected developer container 10R. These discrimination display portions 121L and 121R are used for facilitating discrimination of an associated container when display prompting the operator to exchange either one of the collected developer containers 10L and 10R is made in an operating portion 130 (FIG. 11) of the image forming apparatus 100 as described later. Incidentally, in this embodiment, the discrimination display portions 121L and 121R were provided on the inside surface of the container exchanging door 18, but the present invention is not limited thereto. The discrimination display portions 121L and 121R may also be provided corresponding to the first and second collected developer containers 10L and 10R, respectively, for example, on the front surface of the panel adjacent to the first and second container mounting portions 119L and 119R, respectively.

3. Developer Collecting Device

A structure of the developer collecting device 1 in this embodiment will be described.

<General Structure>

FIG. 4 is a front view of the developer collecting device (feeding device) 1 in this embodiment. FIG. 5 is a perspective view of the developer collecting device 1 in this embodiment as viewed from an obliquely front side. In FIGS. 4 and 5, a collected developer feeding passage 2 in the developer collecting device 1 is principally shown, and the first and second collected developer containers 10L and 10R connected to the developer collecting device 1 are also shown.

In this embodiment, the collected developer feeding passage 2 of the developer collecting device 1 roughly includes an upstream feeding portion 3 and a downstream feeding portion 4. The upstream feeding portion 3 receives the collected developer discharged from the image forming portion G (the drum cleaning devices 106 and the developing devices 104 of the respective stations S and the belt cleaning device 109. The downstream feeding portion 4 receives the collected developer from the upstream feeding portion 3 and feeds the collected developer to the first and second collected developer containers 10L and 10R.

<Upstream Feeding Portion>

With reference to FIGS. 4 and 5, the upstream feeding portion 3 includes first to fifth discharging pipes 31 to 35 and a main discharging pipe 36. In this embodiment, the first to fifth discharging pipes 31 to 35 and the main discharging pipe 36 are provided in the neighborhood of a rear end portion inside the apparatus main assembly 110.

The first to fifth discharging pipes 31 to 35 as discharging feeding portions are hollow pipe-like members extending in the up-down direction along substantially the direction of gravitation.

The first discharging pipe 31 is provided with a first discharging receiving opening 31*a* which is an opening connected to a belt cleaning container discharging opening 192*a* (FIG. 2) and a second discharging receiving opening 31*b* which is an opening connected to a developing container discharging opening 142*a* for yellow (FIG. 2). The second discharging pipe 32 is provided with a first discharging receiving opening 32*a* connected to a drum cleaning container discharging opening 162*a* for yellow (FIG. 2) and a second discharging receiving opening 32*b* which is an opening connected to a developing container discharging opening 142*a* for magenta (FIG. 2). The third discharging pipe 33 is provided with a first discharging receiving opening 33*a* connected to a drum cleaning container discharging opening 162*a* for magenta (FIG. 2) and a second discharging receiving opening 33*b* which is an opening connected to a developing container discharging opening 142*a* for cyan (FIG. 2). The fourth discharging pipe 34 is provided with a first discharging receiving opening 34*a* connected to a drum cleaning container discharging opening 162*a* for cyan (FIG. 2) and a second discharging receiving opening 34*b* which is an opening connected to a developing container discharging opening 142*a* for black (FIG. 2). Further, the fifth discharging pipe 35 is provided with a discharging receiving opening 35*a* connected to a drum cleaning container discharging opening 162*a* for black (FIG. 2). Further, lower end portions of the first to fifth discharging pipe 31 to 35 are connected to the main discharging pipe 36, so that each of the insides of the first to fifth discharging pipes 31 to 35 and the inside of the main discharging pipe 36 communicate with each other so as to enable delivery of the collected developer therebetween.

In this embodiment, the main discharging pipe 36 as a discharge feeding portion (discharge feeding passage) is a hollow pipe-like member extending in the left-right direction along the substantially horizontal direction. Particularly, in this embodiment, the main discharging pipe 36 is constituted by a circular pipe substantially elliptical in cross-section substantially perpendicular to an extension direction (axial direction, extension direction) thereof. To upper side portions of the main discharging pipe 36, the first to fifth discharging pipes 31 to 35 are connected, respectively, and the inside of the main discharging pipe 36 and each of the insides of the first to fifth discharging pipes 31 to 35 communicate with each other so as to permit delivery of the collected developer. Inside (in the hollow portion of) the main discharging pipe 36, a discharging screw 37 as a discharging feeding member is provided. In this embodiment, the discharging screw 37 is constituted by an anaxial screw conveyor (spring anger) rotatable about a rotation shaft extending in the left-right direction along the extension direction (substantially horizontal direction) of the main discharging pipe 36. The discharging screw 37 feeds the collected developer inside the main discharging pipe 36 while stirring the collected developer. Further, a lower side portion of the main discharging pipe 36 positioned between opposite end portions of the main discharging pipe 36 with respect to the extension direction is provided with a main discharging opening (discharge feeding passage discharge opening) 36*a*. This main discharging opening 36*a* is an opening through which the collected developer is dropped and discharged from the main discharging pipe 36 and then is delivered to the downstream feeding portion 4. Incidentally, in this embodiment, the main discharging opening 36*a* is formed at the following position with respect to the horizontal direction in a cross-section substantially perpendicular to the front-rear direction of the image forming apparatus 100. That is, with respect to the direction, the main discharging opening 36*a* is formed in a lower side portion of the main discharging pipe 36 so as to be positioned between first and second lateral pipe discharging openings 42*b* and 42*c* provided in a lateral pipe 42 of the downstream feeding portion 4 described later.

The collected developers sent to the first to fifth discharging pipes 31 to 35 are dropped inside (in the hollow portions of) the first to fifth discharging pipes 31 to 35 by the gravitation and are moved to the main discharging pipe 36. The collected developers dropped and merged with each other in the main discharging pipe 36 are fed to the main discharging opening 36*a* by the discharging screw 37. In this embodiment, the discharging screw 37 has a helical shape such that a left side-first portion 37*a* and a right side-second portion 37*b* with respect to the rotational axis direction thereof are different in helical direction with a position corresponding to the main discharging opening 36*a* as a boundary. The discharging screw 37 is rotationally driven in a predetermined direction by transmission of a rotational driving force from a discriminating driving motor (not shown) as a driving source for a discharge driving portion 126 (FIG. 11) through a drive transmission member (single or plurality of gears or the like) 125. The discharge driving portion 126 is provided in the apparatus main assembly 110. By this, the collected developers sent from the first and second discharging pipes 31 and 32 to the main discharging pipe 36 are fed in a direction from the left side to the right side by the first portion 37*a* of the discharging screw 35 and are sent to the main drum cleaning opening 36*a*. On the other hand, the collected developers sent from the third to fifth discharging pipes 33 to 35 to the main discharging pipe 36 are fed in a direction from the right side to the left side by the second portion 37*b* of the discharging screw 37 and are sent to the main discharging opening 36*a*. The collected developers fed to the main discharging opening 36*a* are dropped through the main discharging opening 36*a* and then are moved toward a vertical pipe 41 of the downstream feeding portion 4 described later.

<Downstream Feeding Portion>

With reference to FIGS. 4 and 5, the downstream feeding portion 4 includes the vertical pipe 41, the lateral pipe 42, and first and second collecting pipes 44L and 44R. The vertical pipe 41 and the lateral pipe 42 are disposed inside the apparatus main assembly 110 in the neighborhood of a rear side-end portion. The first and second collecting pipes 44L and 44R are disposed and extended from the rear side toward the front side above the first and second collected developer containers 10L and 10R, respectively, which are disposed inside the apparatus main assembly 110.

The developer collecting device 1 includes the vertical pipe 41 as a pipe-like vertical feeding portion (vertical feeding passage) for guiding the collected developer, discharged from the image forming portion G, from above to below with respect to the direction of gravitation. In this embodiment, the vertical pipe 41 is a hollow pipe-like member extending vertically along the substantially direction of gravitation. Incidentally, the vertical pipe 41 may also be inclined with respect to the direction of gravitation. Further, in this embodiment, inside the vertical pipe 41, the collected developer is dropped and moved by the gravitation, but a feeding member for feeding the collected developer may also be provided inside the vertical pipe 41. To an upper side portion of the vertical pipe 41, the main discharging pipe 36 of the upstream feeding portion 3 is connected. Further, at an upper side end portion of the vertical pipe 41, a vertical pipe receiving opening 41*a* which is an opening through which the collected developer discharged through the main discharging opening 36*a* is received by the vertical pipe 41 is formed at a position corresponding to the main discharging opening 36*a* of the main discharging pipe 36. By this, the inside of the main discharging pipe 36 and the inside of the vertical pipe 41 communicate with each other through the main discharging opening 36*a* and the vertical pipe receiving opening 41*a*. Further, at a lower side end portion of the vertical pipe 41, a vertical pipe discharging opening 41*b* which is an opening through which the collected developer is dropped and discharged from the vertical pipe 41 by the gravitation and then is delivered to the lateral pipe 42 is formed.

Incidentally, in this embodiment, the vertical pipe discharging opening 41*a* and the vertical pipe discharging opening 41*b* are formed at the following positions with respect to the horizontal direction in the cross-section substantially perpendicular to the front-rear direction of the image forming apparatus 100. That is, with respect to the direction, the vertical pipe discharging opening 41*a* and the vertical pipe discharging opening 41*b* are formed in the vertical pipe 41 so as to be positioned between first and second lateral pipe discharging openings 42*b* and 42*c* provided in the lateral pipe 42 described later.

The developer collecting device 1 includes the lateral pipe 42 as a pipe-like lateral feeding portion (lateral feeding passage). The lateral pipe 42 is capable of guiding the collected developer, fed through the inside of the vertical pipe 41, toward the first collected developer container 10L and the second collected developer container 10R along a direction crossing the direction of gravitation. The lateral pipe 42 is a hollow pipe-like member extending in the left-right direction along the substantially horizontal direction. Incidentally, the lateral pipe 42 may also be inclined with respect to the horizontal direction. Particularly, in this embodiment, the lateral pipe 42 is constituted by a circular pipe substantially circular in cross-section substantially perpendicular to the extension direction (axial direction, extension direction) thereof. To an upper side portion of the lateral pipe 42 between opposite end portions of the lateral pipe 42 with respect to the extension direction, the vertical pipe 42 is connected. Further, at the upper side end portion of the lateral pipe 42, at a position corresponding to the vertical pipe discharging opening 41*b* of the vertical pipe 41, a lateral pipe receiving portion 42*a* which is an opening through which the collected developer discharged through the vertical pipe discharging opening 41*b* is received by the lateral pipe 42 is formed. By this, the inside of the vertical pipe 41 and the inside of the lateral pipe 42 communicate with each other through the vertical pipe discharging opening 41*b* and the lateral pipe receiving opening 42*a*. Further, at lower side end portions of the lateral pipe 42 positioned on opposite sides of the lateral pipe 42 with respect to the extension direction, first and second lateral pipe discharging openings 42*b* and 42*c* are provided, respectively. These first and second lateral pipe discharging openings 42*b* and 42*c* are openings for delivering the collected developer to the first and second collecting pipes 44L and 44R, respectively, by dropping and discharging the collected developer from the lateral pipe 42 by the gravitation. The first lateral pipe discharging opening 42*b* is formed in the neighborhood of a left side end portion (first end portion) of the lateral pipe 42 on one end side, and the second lateral pipe discharging opening 42*c* is formed in the neighborhood of a right side end portion (second end portion) of the lateral pipe 42 on the other end side. Here, the above-described lateral pipe receiving opening 42*a* is provided in the lateral pipe 42 so as to be positioned between the first and second lateral pipe discharging openings 42*b* and 42*c* with respect to the horizontal direction in cross-section substantially perpendicular to the front-rear direction of the image forming apparatus 100. Thus, the lateral pipe 42 is provided with a first lateral pipe discharging opening 42*b*, provided on a first end portion side with respect to an extension direction of the lateral pipe 42, for discharging the collected developer from the lateral pipe 42 toward the first collected developer container 10L. Further, the lateral pipe 42 is provided with a second lateral pipe discharging opening 42*c*, provided on a second end portion side opposite from the first end portion side with respect to the extension direction of the lateral pipe 42, for discharging the collected developer from the lateral pipe 42 toward the second collected developer container 10R. Further, the lateral pipe 42 is provided with a lateral pipe receiving opening 42*a*, provided between the first lateral pipe discharging opening 42*b* and the second lateral pipe discharging opening 42*c* with respect to the extension direction of the lateral pipe 42, for receiving the collected developer from the vertical pipe 41 to the lateral pipe 42.

Inside (in the hollow portion of) the lateral pipe 42, a feeding screw 43 as a feeding member is provided. In this embodiment, the feeding screw 43 is constituted by an anaxial screw conveyor (spring auger) rotatable about a rotation shaft extending in the left-right direction along the extension direction (substantially horizontal direction) of the lateral pipe 42. In this embodiment, the feeding screw 43 has a helical shape such that a direction of winding is one direction. The feeding screw 43 feeds the collected developer inside the lateral pipe 42 while stirring the collected developer. The feeding screw 43 is rotationally driven by transmission of a rotational driving force from a driving portion 5. In this embodiment, the driving portion 5 is constituted by including a driving motor 51 as a driving source, and a driving train (single or plurality of gears or the like) 52 for transmitting the driving force from the driving motor 51 to the feeding screw 43. In this embodiment, the driving motor 51 is disposed on a right side portion of the lateral pipe 42, and the driving train 52 is connected to a right side portion of the feeding screw 43. The driving motor 51 of the driving portion 5 is rotatable in both of normal and reverse directions. By this, the driving portion 5 is capable of rotating the feeding screw 43 in a first direction and a second direction opposite to the first direction. As described above, the feeding screw 43 has the helical shape such that the direction of winding is one direction, and is rotated in the first direction, so that the feeding screw 43 feeds the collected developer inside the lateral pipe 42 from the right side-end portion (second end portion) side toward the left side-end portion (first end portion) side. Further, by rotation in the second direction, the feeding screw 43 feeds the collected developer inside the lateral pipe 42 from the left side-end portion (first end portion) side toward the right side-end portion (second end portion) side. Thus, the developer collecting device 1 includes the feeding screw 43 for feeding the collected developer inside the lateral pipe 42. The feeding screw 43 is provided with a helical-shaped portion with a direction of winding in which the collected developer is fed in the following manner. That is, the feeding screw 43 rotates in the first direction about a rotational axis along the extension direction of the lateral pipe 42 and thus feeds the collected developer along the rotational axis in a direction from the second end portion side toward the first end portion side. Further, this feeding screw 43 rotates in the second direction, opposite to the first direction, about the rotational axis and thus feeds the collected developer along the rotational axis in a direction from the first end portion side toward the second end portion side. Further, the developer collecting device 1 includes the driving portion 5 capable of rotationally driving the feeding screw 43 in the first and second directions.

The developer collecting device 1 includes a first collecting pipe 44L as a pipe-like first collecting feeding portion (first collecting feeding passage) for guiding the collected developer, discharged through the first lateral pipe discharging opening 42*b*, toward the first collected developer container 10L. In this embodiment, the first collecting pipe 44L is a hollow pipe-like member extending in the substantially horizontal direction. Incidentally, the first collecting pipe 44L may also be inclined with respect to the horizontal direction. Particularly, in this embodiment, the first collecting pipe 44L is constituted by a circular pipe substantially circular in cross-section substantially perpendicular to an extension direction (axial direction, extension direction) thereof. The lateral pipe 42 is connected to an upper side portion of the first collecting pipe 44L positioned on a rear side-end portion with respect to the extension direction of the first collecting pipe 44L. Further, at the upper side portion of the first collecting pipe 44L, a first collecting receiving opening 44*a*L is formed in a position corresponding to the first lateral pipe discharging opening 42*b* of the lateral pipe 42. This first collecting receiving opening 44L is an opening for permitting reception of the collected developer, discharged through the first lateral pipe discharging opening 42*b*, by the first collecting pipe 44L. By this, the inside of the lateral pipe 42 and the inside of the first collecting pipe 44L communicate with each other through the first lateral pipe discharging opening 42*b* and the first collecting receiving opening 44*a*L. Further, at a lower side portion of the first collecting pipe 44L positioned at a front side-end portion with respect to the extension direction of the first collecting pipe 44L, a first collecting discharging opening 44*b*L is formed. This first collecting discharging opening 44*b*L is an opening for permitting delivery of the collected developer from the first collecting pipe 44L to the first collected developer container 10L by dropping and discharging the collected developer by the gravitation. Thus, the first collecting pipe 44L includes the first collecting receiving opening 44*a*L, provided on one end portion side with respect to the extension direction of the first collecting pipe 44L, for permitting reception of the collected developer discharged through the first lateral pipe discharging opening 44*b*L, by the first collecting pipe 44L. Further, the first collecting pipe 44L includes the first collecting receiving opening 44*b*L, provided on the other end portion side with respect to the end portion of the first collecting pipe 44L, for permitting discharge of the collected developer from the first collecting pipe 44L toward the first collected developer container 10L.

Inside (hollow portion of) the first collecting pipe 44L, a first collecting screw 45L as a first collecting feeding member is provided. In this embodiment, the first collecting screw 45L is constituted by an anaxial screw conveyor (spring anger) rotatable about a rotational axis extending in the front-rear direction along the extension direction (substantially horizontal direction) of the first collecting pipe 44L. In this embodiment, the first collecting screw 45L has a helical shape such that a direction of winding is one direction. The first collecting screw 45L feeds the collected developer inside the first collecting pipe 44L while stirring the collected developer. FIG. 7 is a sectional view taken along a Y-Y line of FIG. 4. As shown in FIG. 7, the first collecting screw 45L is rotationally driven by transmission of a rotational driving force from a first collecting driving portion 6L. In this embodiment, the first collecting driving portion 6L is constituted by including a first collecting driving motor 61L as a driving source and a first collecting driving train (single or plurality of gears or the like) 62L for transmitting the driving force from the first collecting driving motor 61L to the first collecting screw 45L. In this embodiment, the first collecting driving motor 61L is provided below the first collecting pipe 44L in the neighborhood of a rear side-end portion, and the first collecting driving train 62L is connected to the rear side-end portion of the first collecting screw 45L. The first collecting driving motor 61L of the first collecting driving portion 6L rotates in a predetermined direction. By this, the first collecting driving portion 6L rotationally drives the first collecting screw 45L in a predetermined direction. As described above, the first collecting screw 45L has the helical shape such that the direction of winding is one direction, and is rotated in the predetermined direction, and thus feeds the collected developer inside the first collecting pipe 44L from the rear side-end portion side toward a front side-end portion side. Thus, the developer collecting device 1 includes the first collecting screw 45L for feeding the collected developer inside the first collecting pipe 44L. The first collecting screw 45L includes the helical-shaped portion with a direction of winding in which the collected developer is fed in the following manner. That is, the first collecting screw 45L is rotated in the predetermined direction about the rotational axis along the extension direction of the first collecting pipe 44L. By thus rotation, the first collecting screw 45L feeds the collected developer along the rotational axis from one end portion side (rear side-end portion side) toward the other end portion side (front side-end portion side). Further, in this embodiment, the developer collecting device 1 includes the first collecting driving portion 6L for rotationally driving the first collecting screw 45L.

Further, the developer collecting device 1 includes a second collecting pipe 44R as a pipe-like second collecting feeding portion (second collecting feeding passage) for guiding the collected developer, discharged through the second lateral pipe discharging opening 42*c*, toward the second collected developer container 10R. In this embodiment, the second collecting pipe 44L is a hollow pipe-like member extending in the substantially horizontal direction. Incidentally, the second collecting pipe 44R may also be inclined with respect to the horizontal direction. Particularly, in this embodiment, the second collecting pipe 44R is constituted by a circular pipe substantially circular in cross-section substantially perpendicular to an extension direction (axial direction, extension direction) thereof. The lateral pipe 42 is connected to an upper side portion of the second collecting pipe 44L positioned on a rear side-end portion with respect to the extension direction of the second collecting pipe 44R. Further, at the upper side portion of the first collecting pipe 44L, a second collecting receiving opening 44*a*R is formed in a position corresponding to the second lateral pipe discharging opening 42*c* of the lateral pipe 42. This second collecting receiving opening 44R is an opening for permitting reception of the collected developer, discharged through the second lateral pipe discharging opening 42*c*, by the second collecting pipe 44R. By this, the inside of the lateral pipe 42 and the inside of the second collecting pipe 44R communicate with each other through the second lateral pipe discharging opening 42*c* and the second collecting receiving opening 44*a*R. Further, at a lower side portion of the second collecting pipe 44R positioned at a front side-end portion with respect to the extension direction of the second collecting pipe 44R, a second collecting discharging opening 44*b*R is formed. This second collecting discharging opening 44*b*R is an opening for permitting delivery of the collected developer from the second collecting pipe 44R to the second collected developer container 10R by dropping and discharging the collected developer by the gravitation. Thus, the second collecting pipe 44R includes the second collecting receiving opening 44*a*R, provided on one end portion side with respect to the extension direction of the second collecting pipe 44R, for permitting reception of the collected developer discharged from the second lateral pipe 44R, by the second collecting pipe 44R. Further, the second collecting pipe 44R includes the second collecting receiving opening 44*b*R, provided on the other end portion side with respect to the end portion of the second collecting pipe 44R, for permitting discharge of the collected developer from the second collecting pipe 44R toward the second collected developer container 10R.

Inside (hollow portion of) the second collecting pipe 44R, a second collecting screw 45R as a second collecting feeding member is provided. In this embodiment, the second collecting screw 45L is constituted by an anaxial screw conveyor (spring anger) rotatable about a rotational axis extending in the front-rear direction along the extension direction (substantially horizontal direction) of the second collecting pipe 44R. In this embodiment, the second collecting screw 45R has a helical shape such that a direction of winding is one direction. The second collecting screw 45R feeds the collected developer inside the second collecting pipe 44R while stirring the collected developer. FIG. 6 is a sectional view taken along an X-X line of FIG. 4. As shown in FIG. 6, the second collecting screw 45R is rotationally driven by transmission of a rotational driving force from a second collecting driving portion 6R. In this embodiment, the second collecting driving portion 6R is constituted by including a second collecting driving motor 61R as a driving source and a second collecting driving train (single or plurality of gears or the like) 62R for transmitting the driving force from the second collecting driving motor 61R to the second collecting screw 45R. In this embodiment, the second collecting driving motor 61R is provided below the second collecting pipe 44R in the neighborhood of a rear side-end portion, and the second collecting driving train 62R is connected to the rear side-end portion of the second collecting screw 45R. The second collecting driving motor 61R of the second collecting driving portion 6R rotates in a predetermined direction. By this, the second collecting driving portion 6R rotationally drives the second collecting screw 45R in a predetermined direction. As described above, the second collecting screw 45R has the helical shape such that the direction of winding is one direction, and is rotated in the predetermined direction, and thus feeds the collected developer inside the second collecting pipe 44R from the rear side-end portion side toward a front side-end portion side. Thus, the developer collecting device 1 includes the second collecting screw 45R for feeding the collected developer inside the second collecting pipe 44R. The second collecting screw 45R includes the helical-shaped portion with a direction of winding in which the collected developer is fed in the following manner. That is, the second collecting screw 45R is rotated in the predetermined direction about the rotational axis along the extension direction of the second collecting pipe 44R. By thus rotation, the second collecting screw 45R feeds the collected developer along the rotational axis from one end portion side (rear side-end portion side) toward the other end portion side (front side-end portion side). Further, in this embodiment, the developer collecting device 1 includes the second collecting driving portion 6R for rotationally driving the second collecting screw 45R.

Thus, in this embodiment, the downstream feeding portion 4 includes a first downstream feeding portion (lateral pipe 42, feeding screw 43) which receives the collected developer discharged from the upstream feeding portion 3 and which is capable of feeding the collected developer toward the first collected developer container 10L and the second collected developer container 10R. Further, in this embodiment, the downstream feeding portion 4 includes a second downstream feeding portion (first collecting pipe 44L, first collecting screw 45L) for feeding the collected developer, delivered from the first downstream feeding portion, to the first collected developer container 10L. Further, in this embodiment, the downstream feeding portion 4 includes a third downstream feeding portion (second collecting pipe 44R, second collecting screw 45R) for feeding the collected developer, delivered from the first downstream feeding portion, to the second collected developer container 10R.

Incidentally, a constitution in which the first and second collecting pipes 44L and 44R are not provided and in which for example, the collected developer is sent from the lateral pipe 42 to the first and second collected developer containers 10L and 10R directly may also be employed.

Herein, in this embodiment, the first and second collected developer containers 10L and 10R are provided with first and second container receiving openings 12L and 12R at upper side portions positioned at a front side-end portion in a state in which the first and second collected developer containers 10L and 10R are disposed at predetermined positions inside the apparatus main assembly 110. These first and second container receiving openings 12L and 12R are openings for permitting reception of the collected developers discharged from the first and second collecting discharging openings 44*b*L and 44*b*R into the first and second collected developer containers 10L and 10R, respectively. When the first and second collected developer containers 10L and 10R are mounted at predetermined positions inside the apparatus main assembly 110, the first and second container receiving openings 12L and 12R are disposed at positions corresponding to the first and second collecting discharging portions 44*b*L and 44*b*R, respectively. By this, the insides of the first and second collecting pipes 44L and 44R and the insides the first and second collected developer containers 10L and 10R communicate with each other. Incidentally, in this embodiment, at front side-end portions of the first and second collecting pipes 44L and 44R, first and second shutter members 46L and 46R for switching open and close states of the first and second collecting discharging openings 44*b*L and 44*b*R, respectively, are provided, respectively. These first and second shutter members 46L and 46R are provided on the first and second collecting pipes 44L and 44R, respectively, so as to be slidable (movable) in the front-rear direction, and are urged by shutter urging springs (not shown) in a direction from the rear side toward the front side. Further, immediately before the first and second collected developer containers 10L and 10R are mounted at predetermined positions inside the apparatus main assembly 110, engaging portions (not shown) provided on the first and second collected developer containers 10L and 10R engage with the first and second shutter members 46L and 46R, respectively. Then, the first and second collected developer containers 10L and 10R are further inserted to predetermined positions into the apparatus main assembly 110, so that the first and second shutter members 46L and 46R are moved toward the rear side against an urging force of the above-described shutter urging springs and thus are opened. That is, at this time, the first and second shutter members 46L and 46R are disposed as open positions where the first and second collecting discharging openings 44*b*L and 44*b*R are opened, respectively. When the first and second collected developer containers 10L and 10R are removed from the predetermined positions of the inside of the apparatus main assembly 110, by the operation reverse to the above-described operation, the first and second shutter members 46L and 46R are closed by the urging force of the above-described shutter urging springs. That is, at this time, the first and second shutter members 46L and 46R are disposed at closed positions where the first and second collecting discharging openings 44*b*L and 44*b*R are closed, respectively. Incidentally, the shutter members are not limited to shutter members which are opened and closed in interrelation with movement of the collected developer containers, but for example, may also be opened and closed by appropriate actuator. Further, the first and second collected developer containers 10L and 10R may also be provided with shutter members for opening and closing the first and second container receiving openings 12L and 12R in interrelation with the above-described mounting operation and dismounting operation, for example.

Further, in this embodiment, as shown in FIGS. 6 and 7, inside the first and second collected developer containers 10L and 10R, first and second container screws 13L and 13R as container feeding members for feeding the collected developers accommodated in the collected developer accommodating portions 11L and 11R are provided, respectively. In this embodiment, the first and second container screws 13L and 13R are constituted so as to feed the collected developers from the front side toward the rear side in a state in which the first and second collected developer containers 10L and 10R are disposed at the predetermined positions inside the apparatus main assembly 110. In this embodiment, each of the first and second container screws 13L and 13R includes a rotation shaft portion and a screw blade portion formed helically around the rotation shaft portion. At a rear side-end portion of the rotation shaft portion of each of the first and second container screws 13L and 13R, a drive-receiving portion is provided. Further, when the first and second collected developer containers 10L and 10R are mounted at the predetermined positions inside the apparatus main assembly 110, the drive-receiving portions are connected to first and second couplings 63L and 63R, respectively, provided on the apparatus main assembly 110 side. In this embodiment, to these first and second couplings 63L and 63R, a rotational driving force is transmitted from the above-described first and second collecting driving portions 6L and 6R, respectively, and thus the first and second couplings 63L and 63R are rotated. By this, the first and second container screws 13L and 13R are rotated in interrelation with the first and second collecting screws 45L and 45R, respectively, and thus feed the collected developers inside the first and second collected developer containers 10L and 10R. Incidentally, the first and second couplings 63L and 63R are provided so as to be exposed from first and second container opposite portions 122L and 122R, respectively, described later as shown in FIG. 8.

Thus, in this embodiment, the image forming apparatus 100 includes the developer collecting device 1 as a feed device capable of selectively feeding the collected developer, discharged from the image forming portion G, to the first collected developer container 10L or the second collected developer container 10R. In this embodiment, this developer collecting device 1 as the feeding device includes the main discharging pipe 36, the discharging screw 37, the vertical feeding pipe 41, the latent feeding pipe 42, the feeding screw 43, the first and second collecting pipes 44L and 44R, the first and second collecting screws 45L and 45R, the discharging driving portion 126, the driving portion 5, the first and second collection driving portions 6L and 6R, and the like.

<Container Sensors and so On>

In FIG. 8, the first and second container opposite portions 122L and 122R opposing the first and second collected developer containers 10L and 10R in the rear side-end portions of the first and second container mounting portions 119L and 119R (part (b) of FIG. 3) of the apparatus main assembly 110 are shown.

Further, in this embodiment, the first and second container opposite portions 122L and 122R are provided with first and second container sensors 7L and 7R as container detecting means for detecting the presence or absence (mounting or dismounting state) of the first and second collected developer containers 10L and 10R, respectively. In this embodiment, the first and second container sensors 7L and 7R are constituted by mechanical switches by which a signal outputted to a controller 150 (FIG. 11) described later changes depending on a state or urging or release of urging. The controller 150 is capable of controlling the driving portion 5 on the basis of detection results of the first and second container sensors 7L and 7R. The first container sensor 7L is urged by the first collected developer container 7L when the first collected developer container 7L is disposed at a predetermined position inside the apparatus main assembly 110, i.e., at a position where the first collecting discharging opening 44*b*L and the first container receiving opening 12*b*L communicate with each other. By this, the controller 150 is capable of detecting that the first collected developer container 10L is disposed at the predetermined position. Further, when the first collected developer container 10L is moved (removed) from the predetermined position, the urging of the first container sensor 7L by the first collected developer container 10L is released. By this, the controller 150 is capable of detecting that the first collected developer container 10L was moved from the predetermined position. Similarly, by a signal of the second container sensor 7R, the controller 150 is capable of detecting that the second collected developer container 10R was disposed at the predetermined position or that the second collected developer container 10R was moved from the predetermined position. Incidentally, the container detecting means is not limited to the mechanical switch, but may also be constituted by an optical sensor, for example.

Further, in this embodiment, the first and second container opposite portions 122L and 122R are provided with first and second full (state) sensors 8L and 8R as collected developer detecting means for detecting whether or not the first and second collected developer containers 10L and 10R became full. In this embodiment, the first and second full sensors 8L and 8R are constituted by optical sensors for detecting a signal which is outputted to the controller 150 (FIG. 11) and which changes depending on a state of transmission or non-transmission of detection light. The controller 150 is capable of controlling the driving portion 5 on the basis of detection results of the first and second full sensors 8L and 8R. In this embodiment, each of the first and second full sensors 8L and 8R includes a light emitting (projecting) portion for emitting the detection light and a light receiving portion capable of receiving the detection light emitted from the light emitting portion. When the first and second collected developer containers 10L and 10R are disposed at predetermined positions inside the apparatus main assembly 110, each of detection window portions (not shown) capable of permitting transmission of the detection light and provided on these containers is disposed between the emitting portion and the receiving portion. Inside the detection window portions, the collected developer enters when the collected developer in a predetermined (preset) amount corresponding to a full state is accommodated in the first and second collected developer containers 10L and 10R. For that reason, in the case where the first and second collected developer containers 10L and 10R become full with the collected developer, the detection light of each of the first and second full sensors 8L and 8R is blocked by the collected developer inside the detection window portion. By this, the controller 150 is capable of detecting that the first and second collected developer containers 10L and 10R became full with the collected developer. Incidentally, the collected developer detecting means is not limited to the optical sensor, but may also be constituted by a weight sensor, for example.

Further, in this embodiment, the first and second container opposite portions 122L and 122R are provided with first and second retaining members 9L and 9R, respectively, as retaining members for preventing inadvertent movement of the first and second collected developer containers 10L and 10R in the dismounting direction. The first and second retaining members 9L and 9R engage with engaging portions provided on the first and second collected developer containers 10L and 10R, respectively, when the first and second collected developer containers 10L and 10R are mounted at the predetermined positions inside the apparatus main assembly 110. Engagement of the first and second retaining members 9L and 9R with the first and second collected developer containers 10L and 10R is carried out for preventing movement of the first and second collected developer containers 10L and 10R principally due to the urging force of the above-described shutter urging springs. Accordingly, this engagement is capable of being easily released by a force exerted by the operator in order to move the first and second collected developer containers 10L and 10R for the purpose of dismounting of these containers.

4. Control Mode 4-1. Constitution

FIG. 11 is a schematic block diagram showing a control mode of a principal part of the image forming apparatus 100 in this embodiment. In this embodiment, the apparatus main assembly 110 of the image forming apparatus 100 is provided with the controller 150. The controller 150 is constituted by including a CPU 151 as a calculation (process) control means which is a central element for performing arithmetic processing, a memory (storing medium) 152, such as a RAM or a ROM, as a storing means, and an input/output circuit (not shown) through which signals are inputted and outputted between the controller 150 and each of the respective portions, and the like means. In the RAM which is a rewritable memory, information inputted to the controller 150, detected information, a calculation result and the like are stored, and in the ROM, a data table acquired in advance and the like are stored. Between the CPU 151 and the memory 152 such as the RAM or the ROM, transfer and reading of data can be carried out.

To the controller 150, the respective portions of the image forming portion G are connected. Further, to the controller 150, the driving portion 5, the first and second driving portions 6L and 6R, the first and second container sensors 7L and 7R, the first and second full sensors 8L and 8R, the discharge driving portion 126, and the like of the developer collecting device 1 are connected. Further, to the controller 150, an operating portion (operating panel) 130 provided on the image forming apparatus 100 is connected. The operating portion 130 includes a display portion (image display portion) such as a liquid crystal panel as a display means for displaying information by control of the controller 150, and a voice outputting portion for outputting a voice indicating information. The operating portion 130 includes an inputting portion such as keys as an inputting means for inputting information to the controller 150 by an operation by an operator such as a user or a service person. The operating portion 130 may be constituted by including a touch panel having functions of the display portion and the inputting portion. Further, to the controller 150, an image reading apparatus (not shown) provided in the image forming apparatus 100 or connected to the image forming apparatus 100 and an external device (not shown) such as a personal computer connected to the image forming apparatus 100 may be connected.

The controller 150 carries out integrated control of the respective portions (motors) of various driving portions, power sources for various voltage applying portions, and the (like) of the image forming portion G on the basis of an instruction and information from the operating portion 130 of the image forming apparatus 100 and the external device, so that the controller 150 can cause the image forming portion G to execute the image forming operation. Further, the controller 150 is capable of carrying out integrated control of the respective portions of the developer collecting device 1 so that the controller 150 causes the respective portions to execute a feeding operation of the collected developer to the first and second collected developer containers 10L and 10R and an operation prompting the operator to exchange and mount the respective containers, and the like operation. The controller 150 can also be regarded as constituting a part of the developer collecting device 1.

4-2. Notifying Portion

The image forming apparatus 1 is capable of performing a notifying operation for inducing exchange and mounting of each of the first and second collected developer containers 10L and 10R.

FIG. 18 is a front view of an example of the operating portion 130 of the image forming apparatus 100. The operating portion 130 includes an image display portion 131 for displaying an image on the basis of an instruction from the controller 150, and a voice outputting portion 132 for outputting a voice on the basis of the instruction from the controller 150.

In the case where dismounting of the first collected developer container 10L is detected, the controller 150 causes the operating portion 130 to prompt the user (operator) to mount the first collected developer container 10L in the first container mounting portion 119L by using voice or image display or both the voice and the image display. The controller 150 causes the image display portion 131 to prompt the user to mount an unmounted collected developer container (the first collected developer container 10L in this case) by using the above-described discrimination display portion (the first discrimination display portion 121L in this case) corresponding to the collected developer container to be mounted (i.e., the unmounted collected developer container). For example, the image display portion 131 displays a message that "PLEASE MOUNT LEFT CONTAINER (CONTAINER 1)". It is also possible to output a voice of the same contents as this by the voice outputting portion 132.

Further, for example, in the case where detection that the first collected developer container 10L becomes full is made, the controller 150 can cause the operating portion 130 to prompt the user to exchange the first collected developer container 10L by using the voice or the image display or both the voice and the image display. The controller 150 can cause the image display portion 131 to prompt the user to exchange the collected developer container by using the above-described discrimination display portion (the first discrimination display portion 121L in this case) corresponding to the collected developer container which should be exchanged, i.e., the collected developer container which becomes full. The image display portion 131 displays a message that "PLEASE EXCHANGE LEFT CONTAINER (CONTAINER 1)". It is also possible to output a voice of the same contents as this by the voice output portion 132.

Incidentally, in place of the above-described notification or in combination therewith, the position and the mounting operation of the collected developer container 10L to be mounted or exchanged may also be displayed with moving images by the image display portion 131. Further, the second collected developer container 10R is similarly controlled, so that mounting and exchange of the second collected developer container 10R can be prompted to the operator.

FIG. 19 shows an example of a constitution including the first and second container mounting portions 119L and 119R of the image forming apparatus 100 and a peripheral portion thereof as viewed from the front side. The image forming apparatus 100 includes first and second light emitting portions 95L and 95R provided at positions close to (corresponding to) the first and second collected developer containers 10L and 10R, respectively. In this embodiment, the first and second light emitting portions 95L and 95R are provided on a panel 123 facing the front side at positions adjacent to upper sides of the first and second container mounting portions 119L and 119R, respectively, in a range in which the first and second light emitting portions 95L and 95R at least partially overlap with the first and second container mounting portions 119L and 119R, respectively, with respect to the left-right direction. For example, in the case dismounting of the first collected developer container 10L is detected, the controller 150 can cause the light emitting portion 95L to emit light and thus to prompt the user to mount the first collected developer container 10L in the first container mounting portion. At this time, the second light emitting portion 95R does not emit light.

Further, for example, in the case where detection that the first collected developer container 10L becomes full is made, the controller 150 can cause the light emitting portion 95L to emit light so as to prompt the user to exchange the first collected developer container 10L. At this time, the second light emitting portion 95R does not emit light. Further, the second collected developer container 10R is similarly controlled, so that mounting and exchange of the second collected developer container 10R can be prompted to the operator.

Incidentally, in this embodiment, the notification by the light emitting portions 95L and 95R and by the operating portion 130 was described, but a constitution in which the notification is provided by either one of these portions may also be employed.

5. Operation of Developer Collecting Device

Next, a feeding operation of the collected developer to the first and second collected developer containers 10L and 10R by the developer collecting device 1 in this embodiment will be described. Here, an operation of the developer collecting device 1 when the collected developer is fed to each of the first and second collected developer containers 10L and 10R will be described. A specific example of an operation sequence of the developer collecting device 1 including switch of a feeding destination of the collected developer will be described later.

A Table 1 is a summary of operation states of the driving portion 5 and the first and second collecting driving portions 6L and 6R in the feeding operation of the collected developer to each of the first and second collected developer containers 10L and 10R in this embodiment. This operation is executed by controlling the driving portion 5 and the first and second collecting driving portions 6L and 6R by the controller 150 in accordance with programs stored in the memory 152.

TABLE 1

| FDC*[1] | DPRD*[2] | DOSCDP*[3]6R | DOFCDP*[4]6L |
|---|---|---|---|
| FC*[5]10L | NORMAL | OFF | ON |
| SC*[6]10R | REVERSE | ON | OFF |

*[1]"FDC" is a feeding destination container.
*[2]"DPRD" is a driving portion rotational direction.
*[3]"DOSCDP" is the drive of the second collecting driving portion.
*[4]"DOFCDP" is the drive of the first collecting driving portion.
*[5]"FC" is the first container.
*[6]"SC" is the second container.

<Feeding Operation to First Collected Developer Container 10L>

FIG. 9 shows a flow of the collected developer in the case where the collected developer is fed to the first collected developer container 10L provided on the left side. The first collected developer container 1 sends the collected developer from the image forming portion G to the downstream feeding portion 4 through the upstream feeding portion 3 in the above-described manner. The collected developer sent to the downstream feeding portion 4 passes through the vertical pipe 41 and moves into the lateral pipe 42. When the collected developer is fed to the first collected developer container 10L, the driving motor 51 of the driving portion 5 performs a normal rotation operation, and a driving force is transmitted from the driving portion 5 to the feeding screw 43 in the lateral pipe 42, so that the feeding screw 43 is rotated in the first direction. By this, the feeding screw 43 feeds the collected developer in the lateral pipe 42 in a direction from the right side toward the left side. At this time, in interrelation of the normal rotation operation of the driving motor 51 of the driving portion 5, not only the first collecting driving motor 61L (FIG. 7) of the first collecting driving portion 6L performs a rotation operation but also the second collecting driving motor 61R (FIG. 6) of the second collecting driving portion 6R is in a rest state.

By this, the collected developer fed in the lateral pipe 42 and sent to the first collecting pipe 44L by the feeding screw 43 and then is sent to the first collected developer container 10L by being fed in the first collecting pipe 44L by the first collecting screw 45L. On the other hand, the collected developer sent from the vertical pipe 41 to the lateral pipe 42 is not fed in a direction from the left side toward the right side. Further, the collected developer is also not fed in the second collecting pipe 44R.

For that reason, in the case where the developer collecting device 1 feeds the collected developer to the first collected developer container 10L during the operation (image formation) of the image forming apparatus 100, even when the second collected developer container 10R is dismounted from the apparatus main assembly 110 for exchange, it is possible to suppress leakage and scattering of the collected developer from a periphery of the second collected developer container 10R into the apparatus main assembly 110. That is, according to this embodiment, when the collected developer is fed to the first collected developer container 10L, the collected developer sent from the image forming portion G does not pass through a feeding passage toward the second collected developer container 10R. For that reason, even in the case where the second collected developer container 10R is dismounted, it is possible to reduce a degree of a risk of leakage and scattering of the collected developer from the feeding passage toward the second collected developer container 10R.

Incidentally, in this embodiment, the second collecting pipe 44R is provided with the second shutter member 46R, but by the risk-reducing effect of the leakage and scattering of the collected developer as described above, it is also possible to omit this shutter member and simplify a structure of the shutter member.

<Feeding Operation to Second Collected Developer Container 10R>

FIG. 10 shows a flow of the collected developer in the case where the collected developer is fed to the second collected developer container 10R provided on the right side. The first collected developer container 1 sends the collected developer from the image forming portion G to the downstream feeding portion 4 through the upstream feeding portion 3 in the above-described manner. The collected developer sent to the downstream feeding portion 4 passes through the vertical pipe 41 and moves into the lateral pipe 42. When the collected developer is fed to the second collected developer container 10R, the driving motor 51 of the driving portion 5 performs a reverse rotation operation, and a driving force is transmitted from the driving portion 5 to the feeding screw 43 in the lateral pipe 42, so that the feeding screw 43 is rotated in the first direction. By this, the feeding screw 43 feeds the collected developer in the lateral pipe 42 in a direction from the left side toward the right side. At this time, in interrelation of the reverse rotation operation of the driving motor 51 of the driving portion 5, not only the second collecting driving motor 61R (FIG. 6) of the second collecting driving portion 6R performs a rotation operation but also the first collecting driving motor 61L (FIG. 7) of the first collecting driving portion 6L is in a rest state.

By this, the collected developer fed in the lateral pipe 42 and sent to the second collecting pipe 44R by the feeding screw 43 and then is sent to the first collected developer container 10L by being fed in the second collecting pipe 44R by the second collecting screw 45R. On the other hand, the collected developer sent from the vertical pipe 41 to the lateral pipe 42 is not fed in a direction from the right side toward the left side. Further, the collected developer is also not fed in the first collecting pipe 44L.

For that reason, in the case where the developer collecting device 1 feeds the collected developer to the second collected developer container 10R during the operation (image formation) of the image forming apparatus 100, even when the first collected developer container 10L is dismounted from the apparatus main assembly 110 for exchange, it is possible to suppress leakage and scattering of the collected developer from a periphery of the first collected developer container 10L into the apparatus main assembly 110. That is, according to this embodiment, when the collected developer is fed to the second collected developer container 10R, the collected developer sent from the image forming portion G does not pass through a feeding passage toward the first collected developer container 10L. For that reason, even in the case where the second collected developer container 10R is dismounted, it is possible to reduce a degree of a risk of leakage and scattering of the collected developer from the feeding passage toward the first collected developer container 10L.

Incidentally, in this embodiment, the first collecting pipe 44L is provided with the first shutter member 46L, similarly as in the case of the above-described second shutter member 46R as described above, it is also possible to omit this shutter member and simplify a structure of the shutter member.

Thus, the developer collecting device 1 includes the controller 150 for controlling the driving portion 5 and the first and second collecting driving portions 6L and 6R. Further, when the feeding screw 43 is rotationally driven in the first direction by the driving portion 5, the following control is carried out. That is, the controller 150 carries out control so that not only the first collecting screw 45L is rotationally driven by the first collecting driving portion 6L but also the second collecting screw 45R is rotationally driven by the second collecting driving portion 6R. Further, when the feeding screw 43 is rotationally driven in the second direction by the driving portion 5, the following control is carried out. That is, the controller 150 carries out control so that not only the rotational drive of the first collecting screw 45L by the first collecting driving portion 6L is stopped but also the rotational drive of the second collecting screw 45R by the second collecting driving portion 6R is stopped.

6. Operation Sequence of Developer Collecting Device

Next, the specific example of a basis operation sequence of the developer collecting device 1 including the switching of the feeding destination of the collected developer in the developer collecting device 1 will be described. FIG. 12 is a flowchart showing a procedure of the operation sequence. Here, for simplification, on the precondition that the first and second collected developer containers 10L and 10R are disposed at predetermined positions inside the apparatus main assembly 110, an operation in which the feeding destination of the collected developer is switched during execution of a continuous image forming job will be described. Incidentally, the job is a series of operations for forming and outputting images on a single recording material P or a plurality of recording materials P by a single start instruction. Further, in the following, although description is omitted, the controller 150 also carries out control of the above-described first and second collecting driving portions 6L and 6R in interrelation with the control of the operation of the driving portion 5. Further, in the following, although description is omitted, the discharging screw 37 of the upstream feeding portion 3 is rotationally driven continuously during the image formation, and when the image forming operation is ended (or interrupted), the drive of the discharging screw 35 is stopped.

When the job is inputted and the image forming operation is started (S101), on the basis of the information stored in the memory 152, the controller 150 discriminates whether or not the feeding destination of the collected developer is the first collected developer container 10L (S102). Incidentally, every switching of the feeding destination of the collected developer, the controller 150 causes the memory 152 to store information on a current feeding destination of the collected developer. In the case where the controller 150 discriminated in S102 that the current feeding destination of the collected developer is not the first collected developer container 10L ("NO"), the sequence goes to a process of S112. Further, in the case where the controller 150 discriminated in S102 that the current feeding destination of the collected developer is the first collected developer container 10L ("YES"), the controller 150 causes the driving motor 51 of the driving portion 5 to be normally rotated (normal rotation operation) (S103). Then, on the basis of a signal from the first full sensor 39L, the controller 150 discriminates whether or not the first collected developer container 10L becomes full (whether or not the signal of the first full sensor 39L is "ON") (S104). In the case where the controller 150 discriminated in S104 that the first collected developer container 10L does not become full ("NO"), the controller 150 causes the image forming portion G to continue the image forming operation (S105). Then, the controller 150 discriminates whether or not there is an image which has not yet been outputted in the job (S106). Further, in the case where the controller 150 discriminated in S106 that the image which has not been yet outputted exists ("YES"), the sequence is returned to S104, and in the case where the controller 150 discriminated in S106 that there is no image which has not yet outputted ("NO"), the controller 150 causes the driving motor 51 of the driving portion 5 to stop the drive thereof (S107). Then, the controller 150 ends the image forming operation and thus sends the job (S108). Further, in the case where the controller 150 discriminated in S104 that the first collected developer container 10L becomes full ("YES"), on the basis of a signal from the second full sensor 8R, the controller 150 discriminates whether or not the second collected developer container 10R becomes full (whether or not the signal of the second full sensor 8R is "ON") (S109). In the case where the controller 150 discriminated in S109 that the second collected developer container 10R becomes full ("YES"), the controller 150 causes the driving motor 51 of the driving portion 5 to stop (S110). Then, the controller 150 causes the image forming operation to interrupt (S111). In S111, the controller 150 is capable of causing, for example, the operating portion 130 (or a display portion or the like of the external device) to display a message for notifying the operator of a full state of both the first and second collected developer containers 10L and 10R.

On the other hand, in the case where the controller 150 discriminated in S109 that the second collected developer container 10R does not become full ("NO"), the controller 150 switches a rotational direction of the driving motor of the driving portion 5 and causes the driving motor 51 to be reversely rotated (reverse rotation operation) (S112). By this, the feeding destination of the collected developer is switched from the first collected developer container 10L to the second collected developer container 10R. Incidentally, also in the case where the controller 150 discriminated in S102 that the current feeding destination of the collected developer is not the first collected developer container 10L ("NO"), the controller 150 causes the driving motor of the driving portion 5 to be reversely rotated (reverse rotation operation) (S112). Then, on the basis of a signal from the second full sensor 8R, the controller 150 discriminates whether or not the second collected developer container 10R becomes full (whether or not the signal of the second full sensor 8R is "ON") (S113). In the case where the controller 150 discriminated in S113 that the first collected developer container 10L does not become full ("NO"), the controller 150 causes the image forming portion G to continue the image forming operation (S114). Then, the controller 150 discriminates whether or not there is an image which has not yet been outputted in the job (S115), and in the case where the controller 150 discriminated in S115 that the image which has not yet been outputted exists ("YES"), the sequence is returned to S113, and in the case where the controller 150 discriminated in S115 that there is no image which has not yet been outputted ("NO"), the controller 150 causes the driving motor 51 of the driving portion 5 to stop the drive thereof (S116). Then, the controller 150 ends the image forming operation and thus sends the job (S117). Further, in the case where the controller 150 discriminated in S113 that the second collected developer container 10R becomes full ("YES"), on the basis of a signal from the first full sensor 8L, the controller 150 discriminates whether or not the first collected developer container 10L becomes full (whether or not the signal of the first full sensor 8L is "ON") (S118). In the case where the controller 150 discriminated in S118 that the first collected developer container 10L does not become full ("NO"), the sequence goes to S103. That is, the controller 150 switches the rotational direction of the driving motor 51 of the driving portion 5 and thus causes the driving motor to be normally rotated (normal rotation operation), so that the feeding destination of the collected developer is switched from the second collected developer container 10R to the first collected developer container 10L. Further, in the case where the controller 150 discriminated in S118 that the second collected developer container 10R becomes full ("YES"), the controller 150 causes the driving motor 51 of the driving portion 5 to stop (S119). Then, the controller 150 causes the image forming operation to interrupt (S120). In S120, the controller 150 is capable of causing, for example, the operating portion 130 (or a display portion or the like of the external device) to display a message for notifying the operator of a full state of both the first and second collected developer containers 10L and 10R.

Further, in the case where the container which is the feeding destination of the collected developer is switched by switching the rotational direction of the driving motor 51 of the driving portion 5 in S112 and S103, the controller 150 is capable of carrying out control as follows. That is, the controller 150 can cause, for example, the operating portion 130 (or the display portion or the like of the external device) to display a message notifying (prompting) the operator of that there is a need to exchange the container which became full.

Incidentally, in this embodiment, although description was omitted for simplification, the controller 150 is capable of controlling the image forming operation and the operation of the developer collecting device 1 on the basis of the signals from the first and second container sensors 7L and 7R. For example, when the instruction to start the job is provided, in the case where the controller 150 discriminated that both the first and second collected developer containers are not mounted, the controller 150 is capable of controlling the image forming portion G so as not to start the image forming operation. Further, for example, when a full state of either one of the first and second collected developer containers 10L and 10R is detected, in the case where detection that the other container is not mounted is made, the controller 150 is capable of controlling the image forming position S so as to interrupt the image forming operation. In either case, the controller 150 can cause the operating portion 130 (or the display portion or the like of the external device) to display a message prompting the operator to mount the corresponding container. A specific example will be further described later.

Thus, in this embodiment, in the case where one of the first and second collected developer containers 10L and 10R became full, the feeding destination of the collected developer is switched to the other container, so that the first and second collected developer containers 10L and 10R are used alternately. By this, even when one container becomes full during the image forming operation, the container can be exchanged without stopping the image forming operation. Further, according to this embodiment, even in the case where one container is exchanged during the image forming operation as described above, it is possible to suppress the leakage and the scattering of the collected developer from a periphery of the container into the apparatus main assembly 110.

7. Outline of Operation in Case that Collected Developer Container which is Feeding Destination of Collected Developer is Removed Next, an outline of an operation of the developer collecting device 1 in this embodiment in the case where the collected developer containers 10L and 10R to which the collected developer is fed during the image forming operation are removed will be described. Incidentally, a specific operation in the case where the first collected developer container 10L and the second collected developer container 10R, to which the collected developer is fed during the image forming operation in this embodiment will be described later.

In the case where the collected developer is fed to the left-side first collected developer container 10L during the image forming operation, the driving motor 51 of the driving portion 5 performs normal rotation operation (FIG. 9, table 1). Further, the first collecting driving motor 61L of the first collecting driving portion 6L is in operation (FIG. 9, table 1). Further, the second collecting driving motor 61R of the second collecting driving portion 6R is at rest (FIG. 9, table 1). At this time, when the first collected developer container 10L is dismounted, dismounting of this container is detected by the first container sensor 7L. Then, the rotation operation in the driving motor 51 of the driving portion 5 is switched from the normal rotation operation to a reverse rotation operation. Further, in interrelation with this switching of the rotation operation of the driving motor 51 of the driving portion 5, the operation of the first collecting driving motor 61L of the first collecting driving portion 6L is stopped. Further, in interrelation with the switching of the rotation operation of the driving motor 51 of the driving portion 5, the operation of the second collecting driving motor 61R of the second collecting driving portion 6R is started. Further, in this embodiment, when the first collected developer container 10L is dismounted, the first shutter member 46L is closed. By this, even when the first collected developer container 10L to which the collected developer is fed during the image formation is dismounted, the collected developer sent from the vertical pipe 41 to the lateral pipe 42 is not fed in a direction from the right side toward the left side in the lateral pipe 42. Further, the collected developer is also not fed in the first collecting pipe 44L.

In the case where the collected developer is fed to the right-side second collected developer container 10R during the image forming operation, the driving motor 51 of the driving portion 5 performs reverse rotation operation (FIG. 10, table 1). Further, the second collecting driving motor 61R of the second collecting driving portion 6R is in operation (FIG. 10, table 1). Further, the first collecting driving motor 61L of the first collecting driving portion 6L is at rest (FIG. 10, table 1). At this time, when the second collected developer container 10R is dismounted, dismounting of this container is detected by the second container sensor 7R. Then, the rotation operation is the driving motor 51 of the driving portion 5 is switched from the reverse rotation operation to the normal rotation operation. Further, in interrelation with this switching of the rotation operation of the driving motor 51 of the driving portion 5, the operation of the second collecting driving motor 61R of the second collecting driving portion 6R is stopped. Further, in interrelation with the switching of the rotation operation of the driving motor 51 of the driving portion 5, the operation of the first collecting driving motor 61L of the first collecting driving portion 6L is started. Further, in this embodiment, when the second collected developer container 10R is dismounted, the second shutter member 46R is closed. By this, even when the second collected developer container 10R to which the collected developer is fed during the image formation is dismounted, the collected developer sent from the vertical pipe 41 to the lateral pipe 42 is not fed in a direction from the left side toward the right side in the lateral pipe 42. Further, the collected developer is also not fed in the second collecting pipe 44R.

FIG. 13 is a flowchart showing an outline of a procedure of a basic operation sequence of the developer collecting device 1 during continuous image forming operation in which a switching operation of the collected developer feeding direction due to removal (dismounting) of the collected developer containers 10L and 10R as described above is incorporated. Incidentally, although description is omitted in the following, the discharging screw 37 of the upstream feeding portion 3 is rotationally driven continuously during the image forming operation, and the rotational drive thereof is stopped when the image forming operation ends (or interrupts).

In the procedure of FIG. 13, processes similar to the processes of the procedure of FIG. 12 are represented by the same step numbers (S101 to S120). The procedure of FIG. 13 includes processes S301 to S304 in addition to the processes (S101 to S120) in the procedure of FIG. 12. In this embodiment, the description as the processes explained with reference to FIG. 12 will be appropriately omitted and the processes added in the procedure of FIG. 13 will be principally described.

When the controller 150 causes the driving motor 51 of the driving portion 5 to perform the normal rotation operation in S103, on the basis of the signal from the first container sensor 7L, the controller 150 discriminates whether or not the first collected developer container 10L is mounted (whether or not the signal from the first container sensor 7L is ON) (S301). In the case where the controller 150 discriminated in S301 that the first collected developer container 10L is mounted ("YES"), the procedure goes to the process of S104. On the other hand, in the case where the controller 150 discriminated in S301 that the first collected developer container 10L is not mounted ("NO"), the following control is carried out. That is, on the basis of the signal from the second container sensor 7R, the controller 150 discriminates whether or not the second collected developer container 10R is mounted (whether or not the signal from the second container sensor 7R is ON) (S302). In the case where the controller 150 discriminated in S302 that the second collected developer container 10R is mounted ("YES"), the procedure goes to S109. That is, in this case, as described above, in the case where the second collected developer container 10R does not become full, the description of the collected developer is switched from the first collected developer container 10L to the second collected developer container 10R. On the other hand, in the case where the controller 150 discriminated in S302 that the second collected developer container 10R is not mounted ("NO"), the procedure goes to the process of S110. That is, in this case, as described above, the image forming operation is interrupted.

Further, when the controller 150 causes the driving motor 51 of the driving portion 5 to perform the reverse rotation operation in S112, on the basis of the signal from the second container sensor 7R, the controller 150 discriminates whether or not the second collected developer container 10R is mounted (whether or not the signal from the second container sensor 7R is ON) (S303). In the case where the controller 150 discriminated in S303 that the second collected developer container 10R is mounted ("YES"), the procedure goes to the process of S113. On the other hand, in the case where the controller 150 discriminated in S303 that the second collected developer container 10R is not mounted ("NO"), the following control is carried out. That is, on the basis of the signal from the first container sensor 7L, the controller 150 discriminates whether or not the first collected developer container 10L is mounted (whether or not the signal from the first container sensor 7L is ON) (S304). In the case where the controller 150 discriminated in S304 that the first collected developer container 10L is mounted ("YES"), the procedure goes to S118. That is, in this case, as described above, in the case where the first collected developer container 10L does not become full, the description of the collected developer is switched from the second collected developer container 10R to the first collected developer container 10L. On the other hand, in the case where the controller 150 discriminated in S304 that the second collected developer container 10R is not mounted ("NO"), the procedure goes to the process of S119. That is, in this case, as described above, the image forming operation is interrupted.

8. Specific Operation in Case that Collected Developer Container which is Feeding Destination in this Embodiment is Removed As described above, in the image forming apparatus including the developer collecting device in which the feeding destination of the collected developer is switchable, the case where the collected developer container to which the collected developer is fed during the image forming operation is inadvertently removed (dismounted) would be considered. For example, in the case where the collected developer is fed to the first collected developer container of the first and second collected developer containers and the second collected developer container is disposed in the apparatus main assembly in the full state, it would be considered that the first collected developer container is inadvertently pulled out. However, in such a case, for example, when the image forming operation is immediately stopped in accordance with the operation sequence as shown in FIG. 13, there is a liability that productivity is impaired. This is also true for the case where when the collected developer is fed to the first collected developer container of the first and second collected developer containers, these two collected developer containers are inadvertently removed. Further, for example, it would be considered that in the case where the collected developer is fed to the first collected developer container of the first and second collected developer containers and the second collected developer container is disposed in the apparatus main assembly in an empty state, the first collected developer container is inadvertently pulled out to the outside of the apparatus main assembly. In such a case, for example, when the feeding destination of the collected developer is immediately switched to the second collected developer container in accordance with the operation sequence as shown in FIG. 13, there is a liability that efficient use of the collected developer container is impaired. Here, it would be considered that a constitution such as a locking means for preventing (locking) inadvertent pulling-out of the collected developer container to which the collected developer is fed is provided. However, such a constitution leads to complication of the apparatus and an increase in cost, and therefore, it is desired to omit or simplify the constitution.

Therefore, in this embodiment, even when the collected developer container to which the collected developer is fed during the image forming operation is inadvertently removed, the image forming operation is continued for a predetermined time. Then, after the predetermined time has elapsed, whether the image forming operation is continued without switching the feeding destination of the collected developer or after switching the feeding destination of the collected developer or the image forming operation is stopped is selected.

That is, in a constitution in which the constitution for preventing (locking) the inadvertent pulling-out of the collected developer container to which the collected developer is fed is not provided, it is assumed that the collected developer container which is a current feeding destination of the collected developer and which is not a container to be exchanged is erroneously removed. In this embodiment, even in such a case, the image forming operation is continued for a predetermined time without immediately stopping the operation of the image forming apparatus 100. Then, in the case where the erroneously removed collected developer container is returned into the image forming apparatus 100 in the predetermined time, continuous feeding of the collected developer to the returned collected developer container is enabled. In this embodiment, in the case where the collected developer container during charging (feeding) of the collected developer in the image forming operation is removed, drive of the feeding means for charging (feeding) the collected developer is stopped and the collected developer is temporarily stored in the feeding passage. Thereafter, a charging destination (feeding destination) of the collected developer is selected depending on the mounted state of the collected developer container and the charged state of the collected developer in the collected developer container. In the case where the collected developer container during charging of the collected developer is removed during the image forming operation, when the removed collected developer container is mounted again within a predetermined time and into which the collected developer is still chargeable, the charging of the collected developer into the collected developer container is resumed. Further, in the case where the collected developer container during the charging of the collected developer is removed during the image forming operation, when the removed collected developer container is not mounted within the predetermined time and the collected developer is still chargeable into another collected developer container which has already been mounted, the charging destination of the collected developer is switched to the another collected developer container. By this, the charging of the collected developer to the collected developer container into which the collected developer is chargeable is started. Thus, in this embodiment, in the constitution in which the plurality of the collected developer containers are provided, in the case where the collected developer container during the charging of the collected developer is removed by an erroneous operation, drive of the feeding means for charging the collected developer is stopped, and the collected developer is temporarily stored in the feeding passage. Thereafter, the feeding destination is selected depending on a state (mounting/charging) of the collected developer container.

9. Specific Operation Procedure in Case that Collected Developer Container which is Feeding Destination in this Embodiment is Removed Next, a specific operation procedure of the developer collecting device 1 in this embodiment in the case where each of the collected developer containers 10L and 10R in which the collected developer is fed during the image forming operation will be described.

This operation is executed by controlling the driving portion 5 (driving motor 51), the first and second collection driving portions 6L and 6R (first and second collection driving motors 61L and 61R), and the like by the controller 150 in accordance with a program stored in the memory 152.

<Case that First Collected Developer Container 10L which is Feeding Destination of Collected Developer is Removed>

FIG. 14 is a flowchart showing a procedure of an operation in the case where the first collected developer container 10L is removed when the feeding destination of the collected developer is the first collected developer container 10L. In this case, description will be made by paying attention to an operation such that removal of the first collected developer container 10L to which the collected developer is fed during the image forming operation acts as a trigger.

In the case where the first collected developer container 10L is removed from the apparatus main assembly 110 in a state in which a job is inputted and that the feeding destination of the collected developer is the first collected developer container 10L in the image forming operation (S201), the controller 150 carries out control in the following manner. In a state in which the image forming operation is continued, on the basis of a signal from the first container sensor 7L, the controller 150 discriminates whether or not the first collected developer container 10L is mounted again (whether or not the signal of the first container sensor 7L is ON) (S202). In the case where the controller 150 discriminated in S202 that the first collected developer container 10L is not mounted again ("No"), the controller 150 stops the operations of the driving motor 51 of the driving portion 5 and the first collection driving motor 61L of the collected developer container 6L (S203). Incidentally, in a re-process of S203, in the case where the operations of the driving motor 51 of the driving portion 5 and the first collection driving motor 61L of the first collection driving portion 6L have already been stopped in the previous process S203, the controller 150 continues its state. Then, the controller 150 discriminates whether or not one minute as the predetermined time set in advance has elapsed (S204). In the case where the controller 150 discriminated in S204 that one minute has not elapsed ("No"), the process is returned to the process S202. On the other hand, in the case where the controller 150 discriminated in S204 that one minute has elapsed ("Yes"), the process goes to the process S208. Thus, during one minute as the predetermined time, on the basis of the signal from the first container sensor 7L, the controller 150 repetitively discriminates whether or not the first collected developer container 10L is mounted again (S202 to S204).

Here, in this embodiment, the predetermined time in which the discrimination as to whether or not the first collected developer container 10L is mounted again in the case where the first collected developer container 10L which is the feeding destination of the collected developer is removed is repeated is set at one minute as described above. However, this predetermined time is not limited to the value in this embodiment. This predetermined time is longer than a time required for switching the feeding destination of the collected developer to another collected developer container in accordance with the operation sequence as shown in, for example, FIG. 13 in the case where a collected developer container becomes full. On the other hand, there is a possibility that enablement of setting of this predetermined time so as to be long (i.e., to enable that buffer capacity of the collected developer during the stop of the feeding of the collected developer to the collected developer container is set at an excessively large value) has the influence on downsizing of the apparatus. In the constitution of this embodiment, a normal time required for switching the feeding destination of the collected developer during the above-described full state by the controller 150 can be represented by a time required for outputting a signal of switching the rotational direction of the driving motor 51 depending on a signal of the full (state) sensor or the like by the controller 150. In the constitution of this embodiment, this time is a very short time of milliseconds in unit, for example. Further, in the constitution of this embodiment, a time required for actually switching the feeding direction of the collected developer is about 1.6 sec for falling or rising of drive of the driving motor 51. In the constitution of this embodiment, this time can be represented by a time from a start of rotation of the feeding screw 47 in one direction until the collected developer becomes feedable by a start of rotation of the feeding screw 47 in the other direction. Further, the above-described time is not limited to this, but is set at 30 seconds or more typically although the above-described predetermined time may suitably be set at 2 seconds or more. On the other hand, the above-described predetermined time is not limited to this, but is set at 3 minutes or less typically although the above-described predetermined time may suitably be set at 5 minutes or less. For example, a time required for re-mounting the collected developer container by the operator who erroneously pulled out the collected developer container which is the feeding destination of the collected developer is adequate in many cases when the time falls within the above-described range.

Incidentally, this information on the image density may be an average of the image density of the image to be formed in the job. For example, an average of the image density of the image until the collected developer container which is the feeding destination of the collected developer is removed (such as an average of the image density corresponding to the last predetermined number of sheets subjected to the image formation which has the influence on the buffer capacity, based on the constitution or the like of the collected developer feeding passage). The controller 150 is capable of setting this predetermined time at a first time (for example, one minute) in the case where the image density is a first value and at a second value (for example, 30 seconds) shorter than the first time in the case where the image density is a second value higher than the first value. The above-described information on the amount of the developer is not limited to the information on the image density, but may also be image ratio (print ratio, image duty). Further, for example, a constitution in which the operator such as user can arbitrarily set the above-described predetermined time on the basis of a tendency of the image intended to be formed by the user may be employed. In this case, the controller 150 can cause the memory 152 to store the information on the above-described predetermined time inputted from the operating portion 130 or the like as a setting portion for setting the above-described predetermined time depending on the operation of the operator and then can use the information on the above-described predetermined time.

Further, in this embodiment, in S203, the controller 150 stops the operations of the driving motor 51 of the driving portion 5 and the first collection driving motor 61L of the first collection driving portion 6L as described above. On the other hand, in this embodiment, in S203, the controller 150 does not stop the operation of the discharge driving motor (not shown) of the discharge driving portion 126 for driving the discharging screw 37 of the upstream feeding portion 3 and continues the operation. In this embodiment, the first to fifth discharging pipes 31 to 35, the main discharging pipe 36, and the vertical pipe 41 are used as a buffer for storing the collected developer discharged from the image forming portion G (the drum cleaning device 106 and the developing device 104 of each station S, and the belt cleaning device 109). However, the present invention is not limited to a mode in which an operation of the discharging screw 37 of the upstream feeding portion 3 is continued in a period of the above-described predetermined time. At least in a part of the period of the above-described predetermined time, the operation of the discharging screw 37 of the upstream feeding portion 3 may be stopped. For example, depending on a constitution or the like of the collected developer feeding passage to the main discharging pipe 36 through the first to fifth discharging pipes 31 to 35 and the like, the operation of the discharging screw 37 may be stopped in the period of the above-described predetermined time in some instances.

The controller 150 carries out control in the following manner in the case where the controller 150 discriminated in S202 that the first collected developer container 10L is mounted again within the above-described predetermined time (within one minute) ("Yes"). That is, on the basis of the signal from the first full sensor 8L, the controller 150 discriminates whether or not the first collected developer container 10L is full (whether or not the signal of the first full sensor is ON) (S205). In the case where the controller 150 discriminated in S205 that the first collected developer container 10L is not full ("No"), the controller 150 carries out the following control. That is, the controller 150 resumes the normal rotation of the driving motor 51 of the driving portion 5 and the rotation of the first collection driving motor 61L of the first collection driving portion 6L (S206), and then continues the image forming operation by feeding the collected developer to the first collected developer container 10L (S207). On the other hand, in the case where the controller 150 discriminated in S205 that the first collected developer container 10L is full ("Yes"), the process goes to the process S208.

The controller 150 carries out control in the following manner in the case where the first collected developer container 10L is not mounted again within the above-described predetermined time (within one minute), i.e., in the case where the controller 150 discriminated in S204 that one minute has elapsed ("Yes"). That is, the controller 150 discriminates whether or not the second collected developer container 10R is mounted (whether or not the signal of the second container sensor 7R is ON) on the basis of the signal from the second container sensor 7R (S208). Further, also, in the case where the controller 150 discriminated in S205 that the first collected developer container 10L is full ("Yes"), the controller 150 similarly executes the process S208. In the case where the controller 150 discriminated in S208 that the second collected developer container 10R is not mounted ("No"), the controller 150 stops the operation of the image forming apparatus 100 (stops the image forming operation) (S209). On the other hand, in the case where the controller 150 discriminated in S208 that the second collected developer container 10R is mounted ("Yes"), the controller 150 causes the following control. That is, on the basis of the signal from the second full sensor 8R, the controller 150 discriminates whether or not the second collected developer container 10R is full (whether or not the signal of the second full sensor 8R is ON) (S210). The controller 150 carries out the following control in the case where the controller 150 discriminated in S210 that the second collected developer container 10R is not full ("No"). That is, the controller 150 starts the reverse rotation of the driving motor 51 of the driving portion 5 and the rotation of the collection driving motor 61R of the second collection driving portion 6R (S211), and continues the image forming operation by feeding the collected developer to the second collected developer container 10R (S212). On the other hand, in the case where the controller 150 discriminated in S210 that the second collected developer container 10R is full ("Yes"), the controller 150 stops the operation of the image forming apparatus 100 (stops the image forming operation) (S209).

<Case that Second Collected Developer Container 10R which is Feeding Destination of Collected Developer is Removed>

FIG. 15 is a flowchart showing a procedure of an operation in the case where the second collected developer container 10L is removed when the feeding destination of the collected developer is the second collected developer container 10R. In this case, description will be made by paying attention to an operation such that removal of the second collected developer container 10R to which the collected developer is fed during the image forming operation acts as a trigger.

In the case where the second collected developer container 10R is removed from the apparatus main assembly 110 in a state in which a job is inputted and that the feeding destination of the collected developer is the second collected developer container 10R in the image forming operation (S301), the controller 150 carries out control in the following manner. In a state in which the image forming operation is continued, on the basis of a signal from the second container sensor 7R, the controller 150 discriminates whether or not the first collected developer container 10L is mounted again (whether or not the signal of the second container sensor 7R is ON) (S302). In the case where the controller 150 discriminated in S302 that the second collected developer container 10R is not mounted again ("No"), the controller 150 stops the operations of the driving motor 51 of the driving portion 5 and the second collection driving motor 61R of the collected developer container 6L (S303). Incidentally, in a re-process of S303, in the case where the operations of the driving motor 51 of the driving portion 5 and the second collection driving motor 61R of the second collection driving portion 6R have already been stopped in the previous process S303, the controller 150 continues its state. Then, the controller 150 discriminates whether or not one minute as the predetermined time set in advance has elapsed (S304). In the case where the controller 150 discriminated in S304 that one minute has not elapsed ("No"), the process is returned to the process S302. On the other hand, in the case where the controller 150 discriminated in S304 that one minute has elapsed ("Yes"), the process goes to the process S308. Thus, during one minute as the predetermined time, on the basis of the signal from the second container sensor 7R, the controller 150 repetitively discriminates whether or not the second collected developer container 10R is mounted again (S302 to S304).

Here, in this embodiment, the predetermined time in which the discrimination as to whether or not the second collected developer container 10R is mounted again in the case where the second collected developer container 10R which is the feeding destination of the collected developer is removed is repeated is set at one minute as described above. However, this predetermined time is not limited to the value in this embodiment similarly as in the case of the above-described first collected developer container 10L.

Further, the controller 150 may also be capable of changing the above-described predetermined time depending on information on an amount of the developer used for forming the image in the image forming operation by the image forming portion G. For example, the controller 150 may control the above-described predetermined time so as to be changed depending on the information on the image density of the image to be formed in the job. The controller 150 is capable of setting this predetermined time at a third time (for example, one minute) in the case where the image density is a third value and at a fourth value (for example, 30 seconds) shorter than the third time in the case where the image density is a fourth value higher than the third value. Incidentally, in the case where the third value and the fourth value are the same as the first value and the second value, respectively, which are described above, the third time and the fourth time may be the same as the first time and the second time, respectively, which are described above. Further, the above-described predetermined time may be made different between the case where the first collected developer container 10L is removed and the case where the second collected developer container 10R is removed. Further, similarly as in the case of the above-described first collected developer container 10L, a constitution in which the above-described predetermined time can be arbitrarily set may be employed.

Further, in this embodiment, in S303, the controller 150 stops the operations of the driving motor 51 of the driving portion 5 and the second collection driving motor 61R of the second collection driving portion 6R as described above. On the other hand, in this embodiment, in S303, the controller 150 does not stop the operation of the discharge driving motor (not shown) of the discharge driving portion 126 for driving the discharging screw 37 of the upstream feeding portion 3 and continues the operation. However, similarly as in the case of the above-described first collected developer container 10L, at least in a part of the period of the above-described predetermined time, the operation of the discharging screw 37 of the upstream feeding portion 3 may be stopped.

The controller 150 carries out control in the following manner in the case where the controller 150 discriminated in S302 that the second collected developer container 10R is mounted again within the above-described predetermined time (within one minute) ("Yes"). That is, on the basis of the signal from the second full sensor 8R, the controller 150 discriminates whether or not the second collected developer container 10R is full (whether or not the signal of the first full sensor is ON) (S305). In the case where the controller 150 discriminated in S205 that the first collected developer container 10L is not full ("No"), the controller 150 carries out the following control. That is, the controller 150 resumes the reverse rotation of the driving motor 51 of the driving portion 5 and the rotation of the second collection driving motor 61R of the second collection driving portion 6R (S306), and then continues the image forming operation by feeding the collected developer to the second collected developer container 10R (S307). On the other hand, in the case where the controller 150 discriminated in S305 that the second collected developer container 10R is full ("Yes"), the process goes to the process S308.

The controller 150 carries out control in the following manner in the case where the second collected developer container 10R is not mounted again within the above-described predetermined time (within one minute), i.e., in the case where the controller 150 discriminated in S304 that one minute has elapsed ("Yes"). That is, the controller 150 discriminates whether or not the first collected developer container 10L is mounted (whether or not the signal of the first container sensor 7L is ON) on the basis of the signal from the first container sensor 7L (S308). Further, also, in the case where the controller 150 discriminated in S305 that the second collected developer container 10R is full ("Yes"), the controller 150 similarly executes the process S308. In the case where the controller 150 discriminated in S308 that the first collected developer container 10L is not mounted ("No"), the controller 150 stops the operation of the image forming apparatus 100 (stops the image forming operation) (S309). On the other hand, in the case where the controller 150 discriminated in S308 that the first collected developer container 10L is mounted ("Yes"), the controller 150 causes the following control. That is, on the basis of the signal from the first full sensor 8L, the controller 150 discriminates whether or not the first collected developer container 10L is full (whether or not the signal of the first full sensor 8L is ON) (S310). The controller 150 carries out the following control in the case where the controller 150 discriminated in S310 that the first collected developer container 10L is not full ("No"). That is, the controller 150 starts the normal rotation of the driving motor 51 of the driving portion 5 and the rotation of the collection driving motor 61R of the first collection driving portion 6L (S311), and continues the image forming operation by feeding the collected developer to the first collected developer container 10L (S312). On the other hand, in the case where the controller 150 discriminated in S310 that the first collected developer container 10L is full ("Yes"), the controller 150 stops the operation of the image forming apparatus 100 (stops the image forming operation) (S309).

Incidentally, in this embodiment, the operation in the case where in the developer collecting device 1 in which the first and second collecting pipes 44L and 44R are provided, the collected developer containers 10L and 10R to which the collected developer is fed during the image forming operation are removed was described. However, the developer collecting device 1 may have a constitution in which the collected developer is directly sent from the lateral pipe 42 to the first and second collected developer containers 10L and 10R. In the case of the developer collecting device 1 having this constitution, the first and second collection driving portions 6L and 6R do not exist, so that the control of the operation of the driving portion 5 may only be required to be carried out in S203, S206 and S211 of FIGS. 14 and S303, S306 and S311 of FIG. 15.

As described above, in this embodiment, the developer collecting device 1 does not have the constitution for preventing (locking) inadvertently pulling-out of the collected developer container to which the collected developer is fed. In this embodiment, in such a constitution, even in the case where the collected developer container to which the collected developer is fed is erroneously removed, the image forming operation can be continued for a predetermined time without immediately stopping the operation of the image forming apparatus 100. Then, after the predetermined time has elapsed, whether the image forming operation is continued without switching the feeding destination of the collected developer or by switching the feeding destination of the collected developer, or the image forming operation is stopped is selected. Therefore, according to this embodiment, even in the case where the collected developer container to which the collected developer is fed, it is possible to enable suppression of the lowering in productivity and efficient use of the collected developer container.

Other Embodiments

As described above, the present invention was described in accordance with the specific embodiments, but the present invention is not limited to the above-described embodiments.

In the above-described embodiments, the developer collecting device 1 had the constitution in which each of the first and second collecting screws 45L and 45R is rotationally driven by the driving portion (driving source) different from the feeding screw 43. However, the present invention is not limited to such a constitution, but the developer collecting device 1 may have a constitution in which the first and second collecting screws 45L and 45R are rotationally driven by transmission of the driving force transmitted to the feeding screw 43. Incidentally, in the developer collecting device 1 shown in FIG. 16, elements having the same or corresponding functions or constitutions as those in the above-described embodiments are represented by the same reference numerals or symbols as those in the above-described embodiments. In the developer collecting device 1 shown in FIG. 16, the feeding screw 43 is rotationally driven by transmission of the rotational driving force from the driving portion 5. The driving portion 5 is constituted by including the driving motor 51 as the driving source and a driving train (single or plurality of gears or the like) 52 for transmitting the driving force from the driving motor 51 to the feeding screw 43. Further, first and second drive transmitting portions 20L and 20R are provided so as to be capable of being drive-connected to shaft portions of the feeding screw 43 on a left side and a right side, respectively, with respect to a rotational axis (shaft) direction of the feeding screw 43. Each of the first and second drive transmitting portions 20L and 20R is constituted by including a drive train including a one-way clutch gear as a driving force interrupting member. The first drive transmitting portion 20L is constituted so as to transmit the driving force to the first collecting screw 45L when the feeding screw 43 is rotated in a first direction (direction in which the collected developer is fed toward the first collected developer container 10L). The second drive transmitting portion 20R is constituted so as to interrupt transmission of the driving force toward the second collecting screw 43R at this time. Further, the second drive transmitting portion 20R is constituted so as to transmit the driving force to the second collecting screw 45R when the feeding screw 43 is rotated in a second direction (direction in which the collected developer is fed toward the second collected developer container 10R) which is an opposite direction to the above-described first direction. The first drive transmitting portion 20L is constituted so as to interrupt transmission of the driving force toward the first collecting screw 43L at this time. To the developer collecting device 1 having a constitution, the present invention is similarly applicable. Incidentally, in this case, there is no need to control the operations of the first and second collection driving portions 6L and 6R in interrelation with the control of the operation of the driving portion 5 in the above-described embodiment.

Further, in the above-described embodiment, the developer collecting device 1 had the constitution in which the feeding destination of the collected developer is switched between the first and second collected developer containers 10L and 10R by switching the feeding destination of the collected developer in the lateral pipe 42 through switching of the rotational direction of the feeding screw 43. As described above, by employing such a constitution, in a simple constitution, it becomes easy to suppress leakage and scattering of the collected developer with mounting and dismounting of the collected developer container. However, the present invention is not limited to such an embodiment, but for example, as shown in FIG. 17, the developer collecting device 1 may have a constitution in which the collected developer in the lateral pipe 42 is fed in one direction and in which the charging destination (feeding destination) of the collected developer is switched by opening and closing the shutter member or the like. Incidentally, in the developer collecting device 1 shown in FIG. 17, elements having the same or corresponding functions or constitutions as those in the above-described embodiment are represented by the reference numerals or symbols as those in the above-described embodiment. In the developer collecting device 1 shown in FIG. 17, the feeding screw 43 is rotated in a predetermined one direction, so that the collected developer in the lateral pipe 42 flows in the leftward direction in FIG. 17 toward the first collected developer container 10L and the second collected developer container 10R. The lateral pipe 42 is provided with a first lateral pipe discharging opening 42*b* for permitting discharge of the collected developer toward the first collected developer container 10L and a second lateral pipe discharging opening 42*c* for permitting discharge of the collected developer toward the second collected developer container 10R. Further, the lateral pipe 42 is provided with first and second lateral pipe shutters 47L and 47R for opening and closing the first and second lateral pipe discharging openings 42*b* and 42*c*, respectively. Each of the first and second lateral pipe shutters 47L and 47R is constituted so as to be opened and closed by an appropriate actuator. Further, in the case where the charging destination of the collected developer is set at the first collected developer container 10L, the controller 150 carries out control so that the first lateral pipe shutter 47L is opened and the second lateral pipe shutter 47R is closed. On the other hand, in the case where the charging destination of the collected developer is set at the second collected developer container 10R, the controller 150 carries out control so that the first lateral pipe shutter 47L is closed and the second lateral pipe shutter 47R is opened. By stopping the feeding screw 43 and further by closing the first and second lateral pipe shutters 47L and 47R, the feeding of the collected developer to the first and second collected developer containers 10L and 10R can be stopped. Accordingly, for example, in S203 of FIG. 4, an operation for stopping the driving motor 51 of the driving portion 5 and for closing the first and second lateral pipe shutters 47L and 47R may only be required to be performed. Further, in S206 and S211 of FIG. 14, an operation for resuming (starting) the drive of the driving motor 51 of the driving portion 5 and opening an associated one of the first and second lateral pipe shutters 47L and 47R corresponding to the charging destination may only be required to be performed. These are true for the processes S303, S306 and S311 of FIG. 15.

Further, in the above-described embodiments, the image forming apparatus was the tandem type color image forming apparatus employing the intermediary transfer type, but the present invention is not limited thereto. For example, the image forming apparatus may also be a tandem type color image forming apparatus employing a direct transfer type. This image forming apparatus includes, as is well known by the persons skilled in the art, a recording material carrying member (feeding belt or the like constituted by an endless belt) for carrying and feeding the recording material, in place of the intermediary transfer member in the above-described embodiments. Further, toner images formed on the image bearing members of the plurality of stations are successively transferred onto the recording material carried and fed by the recording material carrying member, and after the transfer, the recording material is discharged to the outside of the image forming apparatus. In this image forming apparatus, an image forming portion includes the respective stations, the recording material carrying member and the fixing device. Further, the image forming apparatus may also be a so-called one drum-type color image forming apparatus in which each of the toner images of a plurality of colors is successively transferred onto a single image bearing member and then is transferred onto the intermediary transfer member or the recording material carrying member. In this image forming apparatus, an image forming portion includes a toner image forming portion (corresponding to the station) for forming the toner images on the single image bearing member, the intermediary transfer member (or the recording material carrying member) and the fixing device. Further, the image forming apparatus may also be a monochromatic image forming apparatus. In this case, an image forming portion includes a toner image forming portion (corresponding to the station) for forming the toner image on a single image bearing member and the fixing device.

According to the present invention, even in the case where the collected developer container in which the collected developer is fed is removed, suppression of a lowering in productivity and efficient use of the collected developer container can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-012465 filed on Jan. 28, 2022, which is hereby incorporated by reference herein in its entirety.

What is claimed is:

1. An image forming apparatus comprising:
- an image forming portion configured to form a toner image;
- a first accommodating container provided detachably mountable and configured to accommodate residual toner discharged from the image forming portion;
- a second accommodating container provided detachably mountable and configured to accommodate the residual toner discharged from the image forming portion;
- a feeding device capable of feeding the residual toner, discharged from the image forming portion, to the first accommodating container and the second accommodating container;
- a first mount detecting portion configured to detect mount of the first accommodating container;
- a second mount detecting portion configured to detect mount of the second accommodating container;
- a first full detecting portion configured to detect a full state of the first accommodating container;

a second full detecting portion configured to detect a full state of the second accommodating container; and a controller capable of controlling the feeding device based on a detection result of the first mount detecting portion, the second mount detecting portion, the first full detecting portion and the second full detecting portion;

wherein the controller controls the feeding device to stop feeding the residual toner to the first accommodating container and controls the image forming portion to continue the image forming operation, in a case it is detected that the first accommodating container is not full and the first accommodating container is dismounted based on the detection result of the first mount detecting portion and the first full detecting portion when the image forming operation is executed in a state in which the residual toner is fed to the first accommodating container by the feeding device, and the controller executes following controls after detection of dismount of the first accommodating container until a predetermined time elapses:

(i) the controller controls the feeding device to stop feeding continuously the residual toner to the first accommodating container and not to start feeding the residual toner to the second accommodating container and controls the image forming portion to continue the image forming operation in a case it is detected continuously that the first accommodating container is not mounted based on the detection result of the first mount detecting portion, and (ii) the controller controls the feeding device to resume feeding the residual toner to the first accommodating container and controls the image forming portion to continue the image forming operation in a case it is detected that the first accommodating container is mounted again based on the detection result of the first mount detecting portion.

2. An image forming apparatus according to claim 1, wherein the controller controls the feeding device to start feeding the residual toner to the second accommodating container and controls the image forming portion to continue the image forming operation in a case it is not detected that the first accommodating container is mounted again after detection of dismount of the first accommodating container until the predetermined time elapses based on the detection result of the first mount detecting portion.

3. An image forming apparatus according to claim 1, wherein the predetermined time is longer than a time required to switch the feeding destination of the residual toner from the first accommodating container to the second accommodating container in a case that the controller detects that the first accommodating container is full when the residual toner is fed to the first accommodating container during the image forming operation.

4. An image forming apparatus according to claim 1, wherein the predetermined time is 2 seconds or more and 5 minutes or less.

5. An image forming apparatus according to claim 1, wherein the controller is capable of changing the predetermined time depending on information on an amount of toner used for forming an image in the image forming operation by the image forming portion.

6. An image forming apparatus according to claim 5, wherein the information is information on an image density.

7. An image forming apparatus according to claim 1, further comprising an input portion configured to manually input an instruction, and a setting portion configured to change the predetermined time based on the instruction.

8. An image forming apparatus according to claim 1, further comprising:

a first mounting portion to which the first accommodating container is detachably mountable;

a second mounting portion to which the second accommodating container is detachably mountable; and a common door configured to open and close the first mounting portion and the second mounting portion, wherein the door is openable and closable during the image forming operation.

* * * * *